(12) United States Patent
Rausch et al.

(10) Patent No.: US 7,097,250 B2
(45) Date of Patent: Aug. 29, 2006

(54) EASY-ENTRY MOTOR VEHICLE SEAT WITH SEAT BACK RELEASE UPON RETURN TO MEMORY POSITION

(75) Inventors: Peter Rausch, Niederfüllbach (DE); Werner Taubmann, Lautertal (DE); Jürgen Koppenstein, Grub am Forst (DE)

(73) Assignee: Brose Fahrzeugteile GmbH & Co KG, Coburg (DE)

( * ) Notice: Subject to any disclaimer, the term of this patent is extended or adjusted under 35 U.S.C. 154(b) by 341 days.

(21) Appl. No.: 10/478,425

(22) PCT Filed: May 22, 2002

(86) PCT No.: PCT/DE02/01909

§ 371 (c)(1),
(2), (4) Date: Nov. 21, 2003

(87) PCT Pub. No.: WO02/094605

PCT Pub. Date: Nov. 28, 2002

(65) Prior Publication Data

US 2004/0164600 A1    Aug. 26, 2004

(30) Foreign Application Priority Data

May 25, 2001   (DE) ................................ 101 27 153

(51) Int. Cl.
*B60N 2/22*   (2006.01)
(52) U.S. Cl. .................. 297/341; 297/378.12
(58) Field of Classification Search ........... 297/378.12, 297/341; 248/429
See application file for complete search history.

(56) References Cited

U.S. PATENT DOCUMENTS 5,927,809 A    7/1999  Tame
5,944,383 A *  8/1999  Mathey et al. ............. 297/341
6,048,030 A *  4/2000  Kanda et al. ............... 297/341

FOREIGN PATENT DOCUMENTS

| DE | 44 23 634     | 1/1996  |
| DE | 44 23 634 A1  | 1/1996  |
| DE | 299 10 720 U1 | 9/1999  |
| EP | 0 800 952 A1  | 10/1997 |
| WO | WO 00/55002   | 9/2000  |
| WO | WO 00/55002 A3| 9/2000  |

* cited by examiner

OTHER PUBLICATIONS

International Search Report of PCT/DE02/01909, dated Oct. 4, 2002.

*Primary Examiner*—Milton Nelson, Jr.
(74) *Attorney, Agent, or Firm*—Christie, Parker & Hale, LLP

(57) ABSTRACT

A motor vehicle seat including: a seat frame; a pivotally mounted seat back which, when released, is tiltable forward out of its position of use and toward a seat surface of the seat frame; a longitudinal guide with which the seat frame is displaceable in the longitudinal direction of the seat; a fixing device for fixing a seat frame in a previously adjusted longitudinal position of the seat; a coupling mechanism; and, a memory device by which the seat frame can be automatically held in an adjustable longitudinal position of the seat, which is defined as a memory position. An actuating mechanism is actively connected to a seat back release for the forward tilted seat back and actuates the seat back release when the memory position of the seat frame is reached, thereby enabling the seat back to be tilted into a position of use once again.

13 Claims, 20 Drawing Sheets

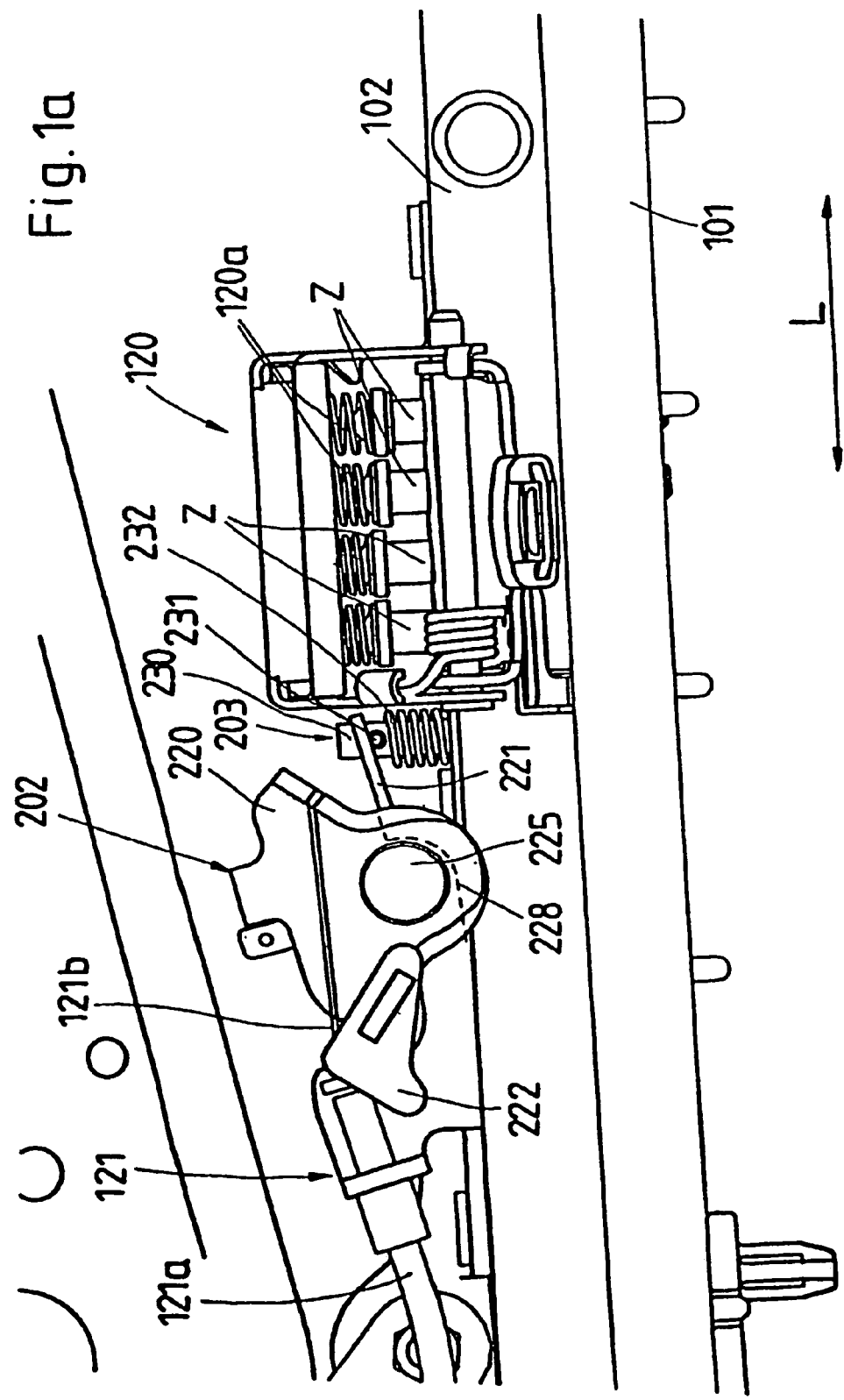

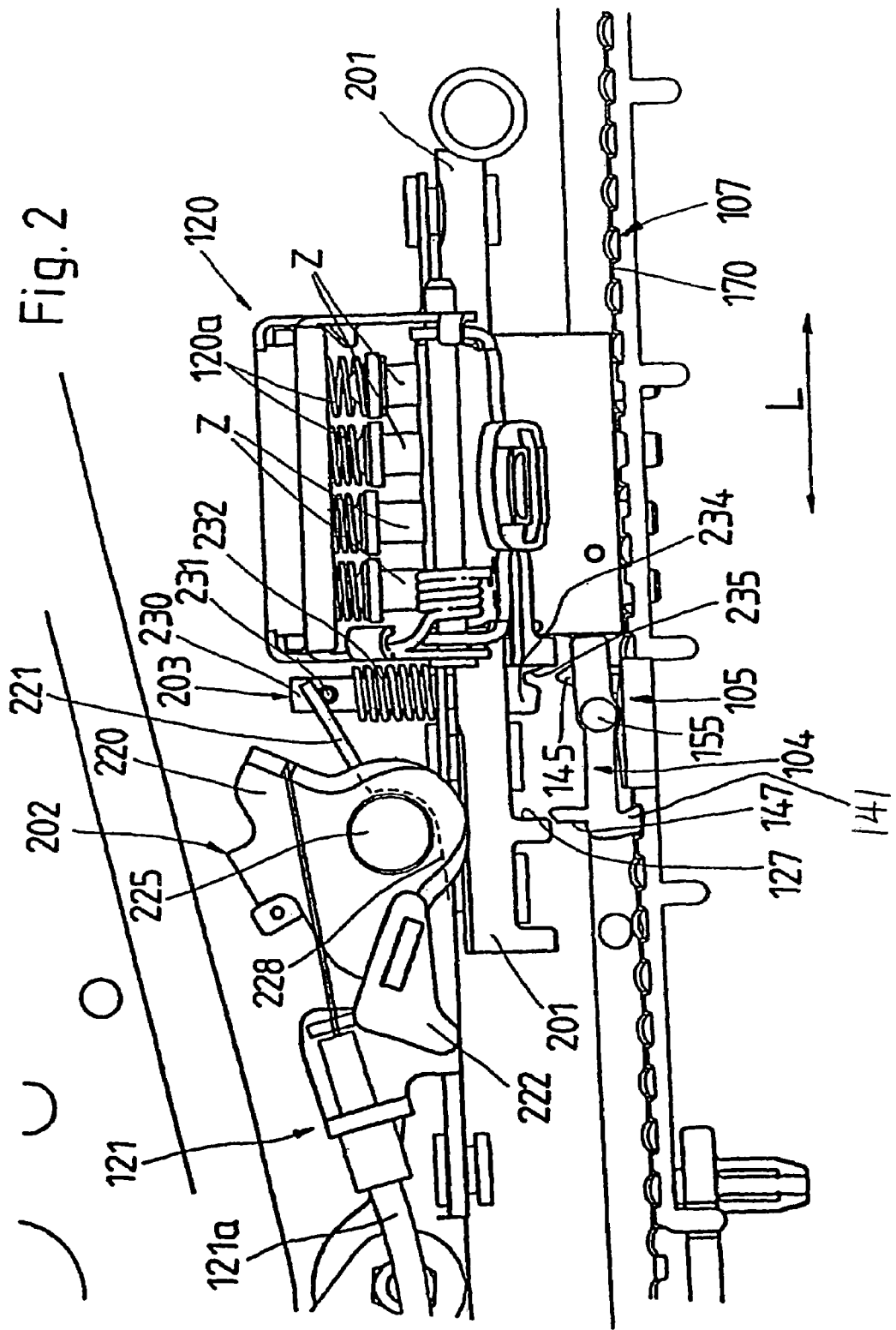

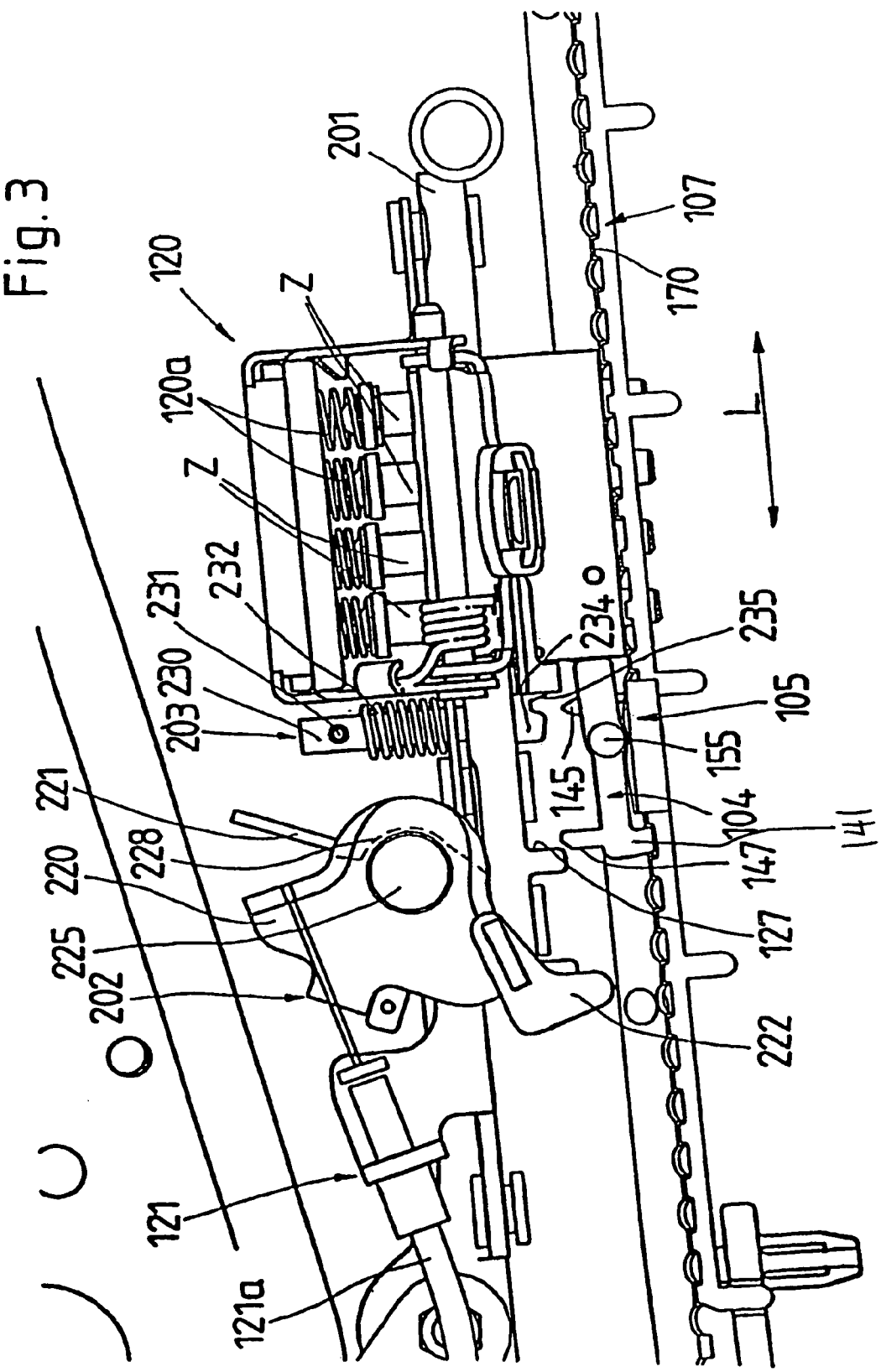

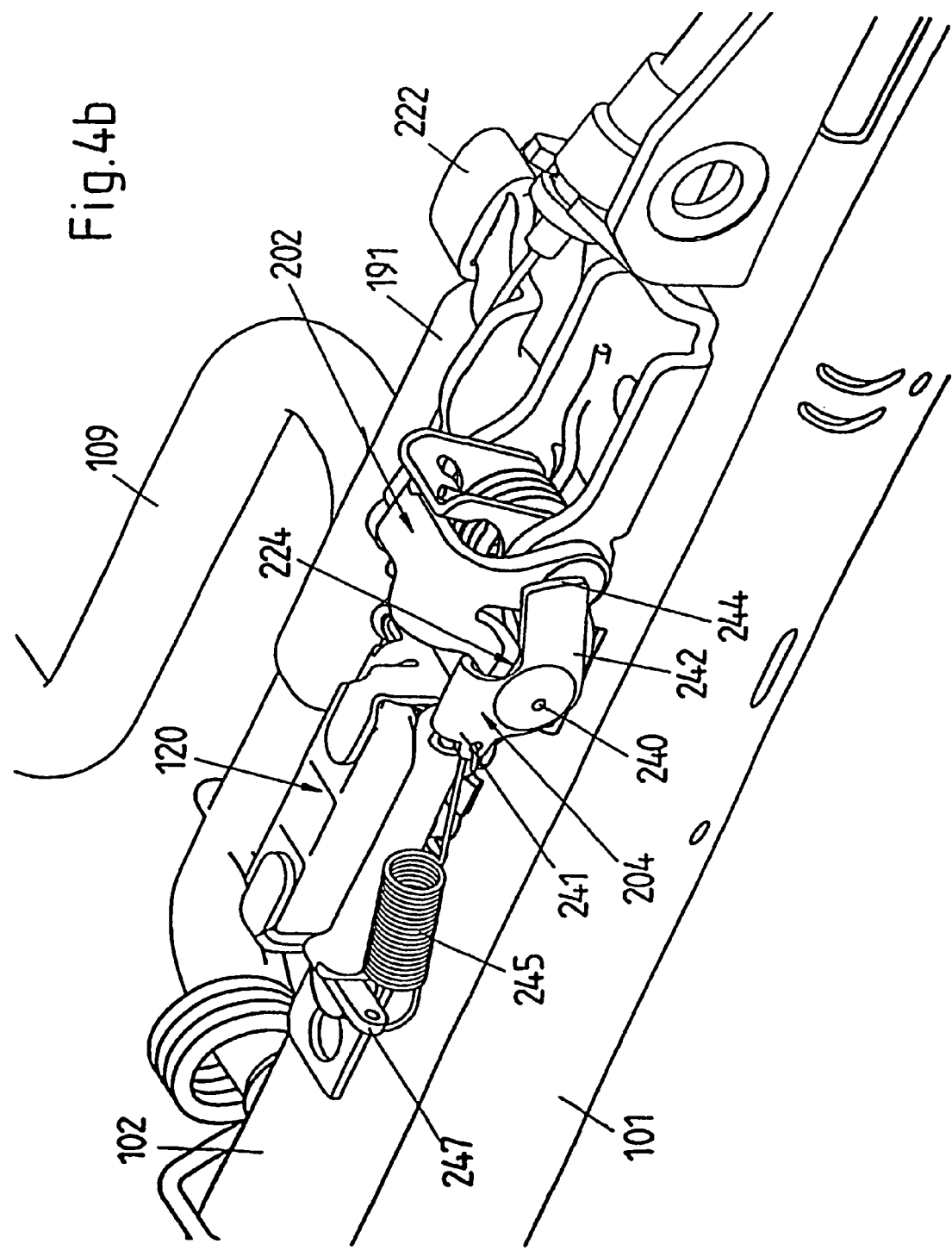

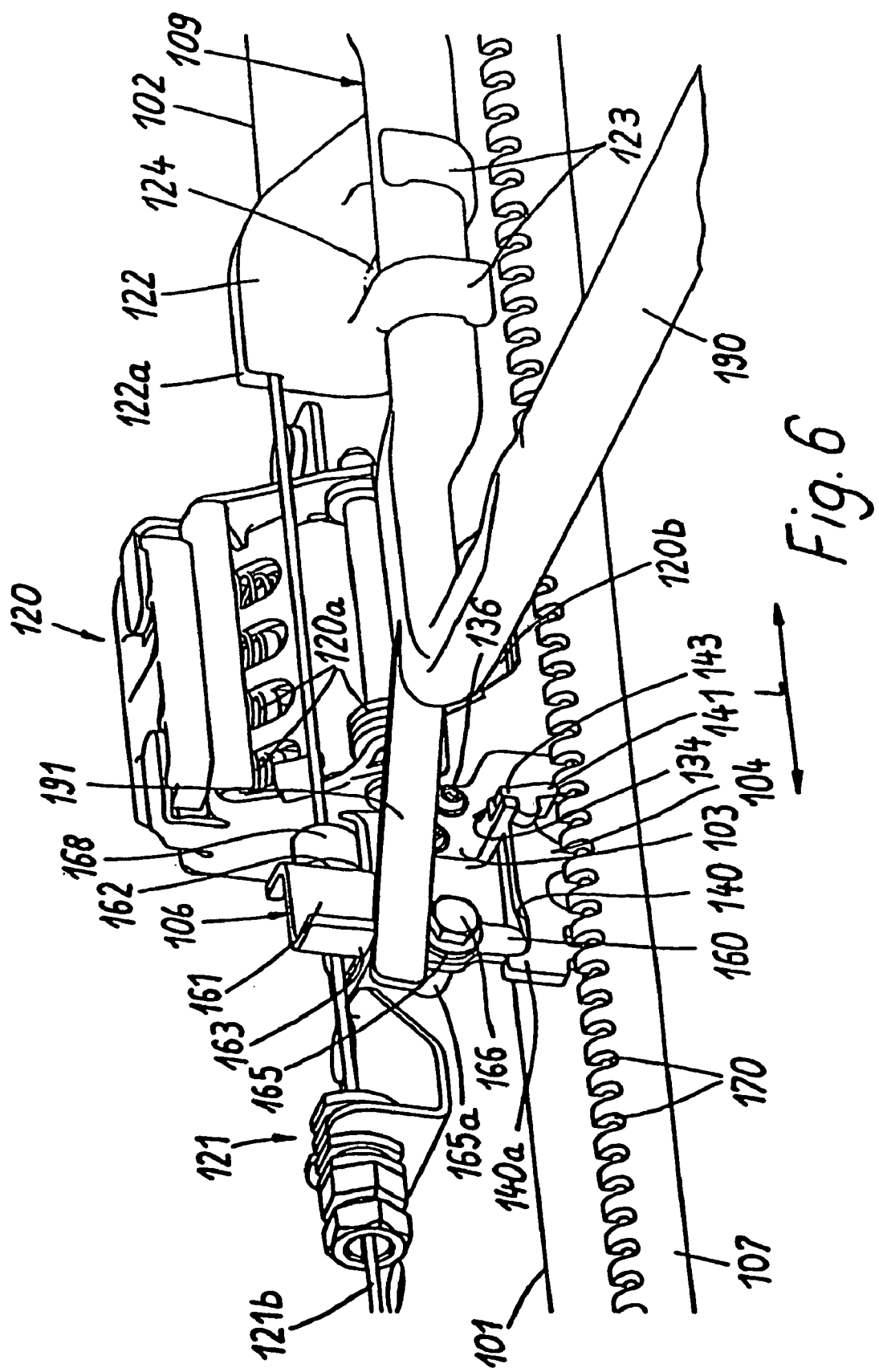

EASY-ENTRY MOTOR VEHICLE SEAT WITH SEAT BACK RELEASE UPON RETURN TO MEMORY POSITION

CROSS REFERENCE TO RELATED APPLICATION

This application is a National Phase Patent Application of International Application Number PCT/DE02/01909, filed on May 22, 2002, which claims priority of German Patent Application Number 101 27 153.0, filed on May 25, 2001.

BACKGROUND

The invention refers to a motor vehicle seat. This seat comprises a seat frame, a seating surface provided on the seat frame, and a seat back pivotally mounted to the seat frame which can be tilted in the direction of the seat surface of the seat frame in the released position of a seat back fixing device from its position of use (corresponding to the seat back tilted up) in order to trigger a so-called easy-entry function.

Such seats are used as front seats in motor vehicles whereby the forward tilting of the seat back facilitates the entry of a passenger or the sliding in of an object into the back of the motor vehicle. Entering the vehicle is also made easier, which is of significance in two-door vehicles, in that the seat can be moved forward after tilting the seat back forward. For this, a motor vehicle seat known from WO 00/55002 (see corresponding U.S. Pat. No. 6,631,952) comprises the following:

a seat frame;
a seating surface provided on the seat frame;
a seat back that is pivotally mounted on the seat frame and which can be tilted in the direction of the seating surface;
a longitudinal guide by which the seat frame is displaceable in the longitudinal direction of the seat for the adjustment of the longitudinal seat position,
a fixing device for fixing the seat frame in a previously set longitudinal seat position;
an actuation element for the releasing of the fixing device such that the seat frame is displaceable in the longitudinal direction of the seat;
a coupling mechanism for the coupling of the fixing device with the seat back that acts on the actuation element thus unlocking the fixing device when the seat back is tilted forward in direction of the seat surface;
a memory device by which the seat frame can be stopped in a movement in the longitudinal seat direction at a defined longitudinal seat position, whereby a stop moveable in the longitudinal seat direction engages a counterstop of the memory device;
an adjustment device of the memory device by which the memory position is adjustable by displacing the position of the counterstop in the longitudinal seat direction;
a locking device of the memory device for the locking of a preset memory position; and
switching means with which the locking device can be unlocked in order to set the memory position.

Such a seat provides the possibility to move the seat frame after forward tilting of the seat back in the direction of the seat surface, and thus the entire seat of the vehicle, to the front in order to facilitate the entry of a passenger into the rear of the car (easy-entry function). At the same time, the seat subsequently can be moved very simply back into its original longitudinal seat position if this longitudinal seat position is stored as a memory position in the memory device provided for this. In this case, when the seat is being moved backward, the seat frame is automatically stopped in the memory position, whereby a stop corresponding to the seat frame works in conjunction with a counterstop of the memory device.

In the motor vehicle seat known from WO 00/55002 (see corresponding U.S. Pat. No. 6,631,952), it is furthermore provided that the coupling mechanism that acts on the actuation element of the fixing device and releases it when the seat back is tilted forward in the direction of the seat surface acts on the actuation element only so long as the seat back is tilted forward. By locking the fixing device, the seat frame thus is blockable at any time when the seat back is no longer tilted forward, i.e., has been tilted back again into its use position. This means, in particular, that with the seat back tilted up, the blockability of the seat frame in a current longitudinal seat position is independent from whether the respective longitudinal seat position corresponds to the memory position or not.

The seat frame is defined here as all parts of the supporting seat construction moveable in the longitudinal direction of the seat, i.e., in particular, including those parts of the longitudinal seat guide, such as a seat rail (upper rail), that are moved in the longitudinal direction in an adjustment of the longitudinal seat position.

SUMMARY

The object of the invention is to provide an improved motor vehicle seat of the type described above to increase the ease of operation in the execution of the easy-entry function.

Accordingly, the seat frame is provided with an actuation mechanism that is in a working connection with a seat back unlocking device which releases the seat back upon reaching the memory position of the seat frame such that the seat back (tilted forward on the seat surface for moving the seat when executing the easy-entry function) can be tilted back again into a functional (upright) position.

In the motor vehicle seat according to the invention, a seat back locking device is provided for the locking of the seat back not only in its use position (an essentially vertical position of the seat back where it can support the back of a person seated on the seat) but also for the locking of the seat back in a position where it is tilted forward in the direction of the seat surface thus making possible the displacement of the seat frame to execute the easy-entry function. Extremely different locking devices may be provided for the locking of the seat back in its use position on the one hand and its forward tilted position on the other. Such devices for the locking of seat backs in a forward tilted position as well as corresponding arrangements for the release of such locking mechanisms are known and thus not described in further detail here.

The release of the seat back for the purpose of forward tilting of the seat back takes place in a known manner by actuation of the unlocking device by means of an actuation lever provided on the seat back whereby the tilting forward of the seat back in the direction of the seat surface of a seat frame is enabled. The fixing device of the longitudinal seat guide is released such that the seat can be moved forward while the seat back is tilted into a forward position. It is thus achieved that the seat back remains in the forward tilted position during the subsequent moving back into the memory position (after the entry of the passenger into the back of the motor vehicle is completed). This facilitates the handling of the seat during forward displacement (in order to facilitate the entry of persons into the back of the motor vehicle) and the subsequent moving back (in order to return the seat to its memory position where the driver, or the passenger, can sit on it) and increases the ease of operation.

When the memory position is reached, the forward tilted seat back is then released without the need to actuate a lever, switch or the like. Instead, the release occurs according to the invention by means of an actuation mechanism that is triggered when the memory position is reached and actuates a seat back release that cancels the locking of the seat back. This then easily enables the subsequent tilting up of the seat back into a use position where it can serve as a support for the back of a person located on the seat.

The triggering of the actuation mechanism that causes the release of the seat back preferably takes place automatically when the memory position of the seat frame is reached, e.g., in that the actuation mechanism comprises a trigger element which, upon reaching the memory position, comes into stopping contact with a component of the memory device thus triggering the actuation mechanism that cancels the locking of the seat back.

The triggering element preferably is provided as a pivotably supported trigger lever that has a stop hook that, when the memory position is reached, comes into stopping contact with a component of the memory device.

For the release of the seat back, the trigger element can, for example, be coupled via a pulling device, in particular in the form of a Bowden control cable, whereby the trigger element is preferably connected to the Bowden cable by means of a lever arrangement.

In order to ensure that the seat back is truly locked into position when the seat, with the seat back tilted forward for the execution of the easy-entry function, is outside the memory position, the actuation mechanism is elastically pre-tensioned such that it can not cause a release of the seat back outside the memory position of the seat frame. For this, an elastic element (spring element) may, for example, act on the trigger element.

In a preferred embodiment of the invention, the pulling means, through which the actuation mechanism can act on the seat back release, is a separate component group independent of the coupling mechanism that serves to actuate the fixing device during the forward tilting of the seat back. In other words, the pulling means is not a component of this coupling mechanism. In a corresponding manner, the lever arrangement by which the trigger element of the actuation mechanism is connected to the pulling means can be designed as a separate assembly independent of the coupling mechanism.

BRIEF DESCRIPTION OF THE DRAWINGS

Additional characteristics and advantages of the invention are explained in the following description of an exemplary embodiment with reference to the drawings.

FIG. 1a is a perspective view of components of a seat frame with a longitudinal seat guide, a fixing device of the longitudinal seat guide as well as a programmable memory device for the automatic finding of the preset longitudinal seat position in a state in which the seat back of the corresponding seat is in its use position;

FIG. 2 is a view according to FIG. 1b, in which the seat back of the seat is tilted slightly forward from its use position;

FIG. 3 is another view according to FIG. 1b, in which the seat back of the seat is tilted forward onto the associated seat surface;

FIG. 4b is a perspective rear view of the arrangement from FIG. 4a;

FIG. 5b is an exploded view of FIG. 5a;

FIG. 6 is a perspective view of a seat frame of the prior art in a state in which the seat is locked in its memory position with the seat back tilted up;

DETAILED DESCRIPTION

Figure 11:
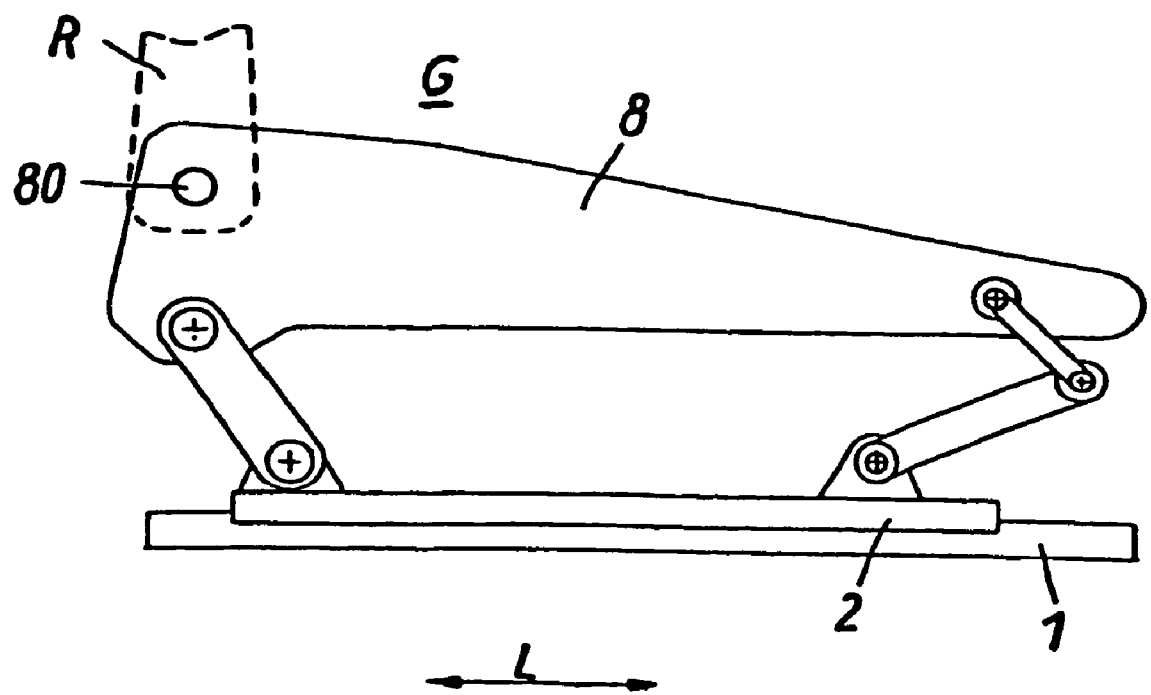
FIG. 11 is a schematic view of a seat frame.

The seat frame G (seat underframe) shown in a side view in FIG. 11 comprises a seat rail 2 that is supported moveably in the longitudinal seat direction L on a subrail 1 to be attached to a car body and a lateral seat part 8 that is height-adjustably hinged via the front and rear joint lever to the seat rail 2. On its other longitudinal side that cannot be seen in FIG. 11, the seat frame G has a corresponding arrangement. A seat surface (not shown) that accommodates a seat cushion on which a vehicle passenger may sit extends between the two lateral seat parts of the seat frame G.

Each of the lateral parts 8 of the seat frame G also has a support location 80 for the swivelable support of a seat back R indicated by a broken line in FIG. 11.

Here, all those components that are moveable in the longitudinal direction on the subrail 1 attached to the car body are considered parts of the seat frame, i.e., in particular, the seat rail 2, the lateral seat part 8 as well as the additional components of the seat connected thereto.

When such a vehicle seat, adjustable in the longitudinal direction L, is used in a two-door vehicle, it is known to couple the back seat to the longitudinal seat adjustment to facilitate entry into the back of the car such that a fixing device associated with the longitudinal seat guide 1, 2 is released while tilting the seat back R forward in the direction toward the seat surface extending between the lateral seat parts 8 and the seat can be moved forward with the seat back tilted forward. This is a so-called easy-entry function.

In the following, the basic principle of the easy-entry function using a programmable memory device for the automatic finding of a presettable longitudinal seat position is explained first with reference to a seat arrangements depicted in FIGS. 6 through 10 and known from WO 00/55002. For further details in this regard, reference is made to WO 00/55002 (see corresponding U.S. Pat. No. 6,631,952), which is hereby expressly incorporated by reference in this description.

Figure 6A:
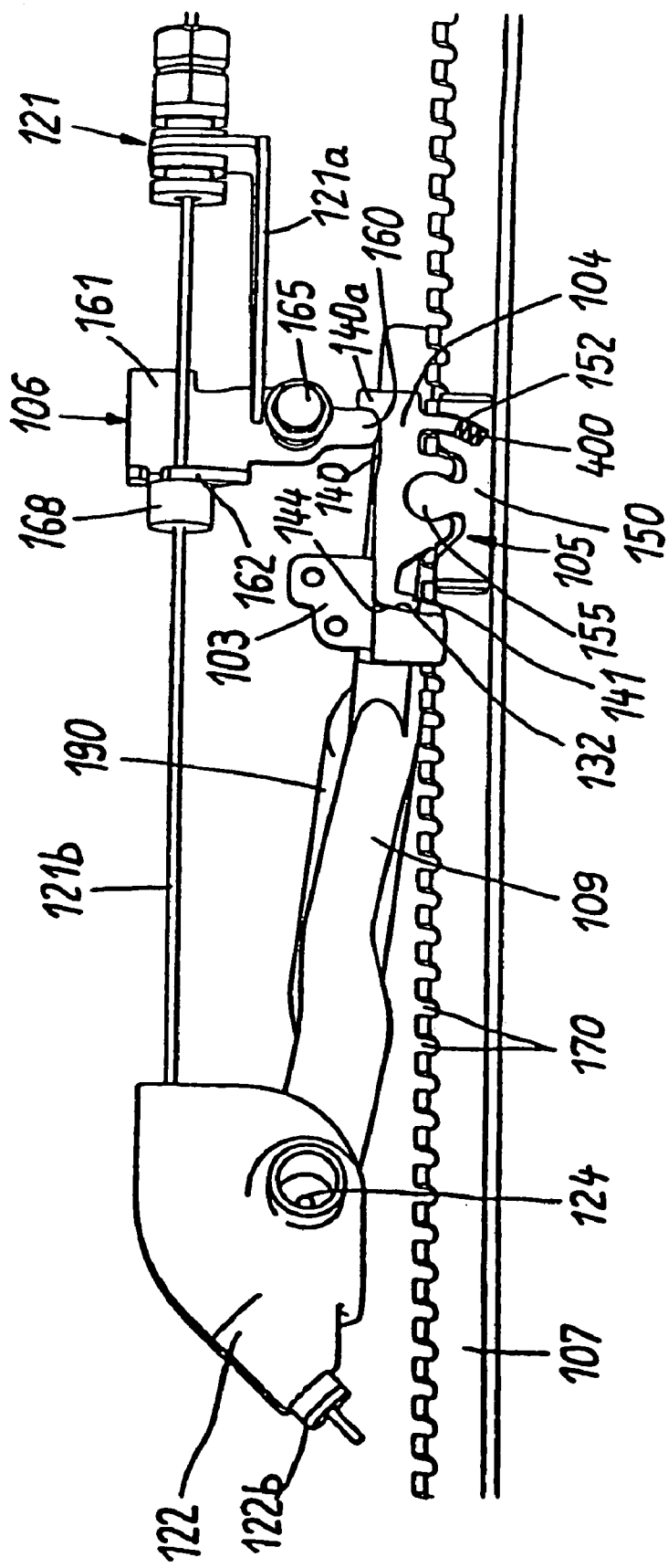
FIG. 6a is a rear view of the view from FIG. 6.

In the perspective front view according to FIG. 6, as well as in its corresponding rear view according to FIG. 6a, a rail 101 fixedly attached to the car body and a seat rail 102 moveably guided in the longitudinal seat direction L attached to it are depicted, in which the rail 101 fixedly attached to the car body has attached an arresting rail 107 with a plurality of arresting openings 170 arranged one after another in the longitudinal seat direction L. The seat rail 102 carries the other components of the seat frame, cf. FIG. 11.

The seat rail 102 is arrestable with regard to the rail 101 fixedly attached to the car body by means of a fixing device 120. This can be a conventional fixing device for the adjustment of longitudinal seat positions. FIGS. 6 and 6a depict the housing, a swivelably mounted actuation element 120b as well as a torsion spring of a known fixing device, whose housing is attached to the seat rail 102, which spring acts on the actuation element.

According to DE 299 10 720 U1, this fixing device comprises a plurality of locking teeth arranged within the housing, which—by means of springs supported in the housing in the form of helical springs—are mounted elastically pre-tensioned in the direction of an arresting device to the rail 101 on the car body side and are not discernible in FIGS. 6 and 6a. Because of the pre-tension acting on the locking teeth, the locking teeth associated with the seat rail 102 automatically engage in the arresting device attached to the car body, such that the longitudinal seat adjustment is arrested unless the locking teeth are brought beyond engagement with the arresting device by means of an actuation element 120b provided for this.

Since the actuation element 120b in the fixing device 120 is pre-tensioned against the direction in which it must be swiveled for the release of the fixing device 120 by means of the spring arrangement 120a, consisting of the springs acting on the locking teeth arranged within the housing as well as the helical springs arranged outside of the housing, the fixing device 120 can be released only if a force countering the action of the spring arrangement 120a is exerted on its actuation element 120b.

On the one hand, for the release of the fixing device 120, the actuation element 120b can be actuated directly by the seat user in that he grips an actuation handle 190 on an actuation lever 109 swivelably hinged on the seat frame and with a transverse pipe provided for this (not discernible in FIGS. 6 and 6a) and swivels it in a counter-clockwise direction, whereby the actuation element 120b moves downward against the pre-tension of the spring arrangement 120a. On the other hand, the fixing device 120 can also be released by forward tilting of the seat back, for which purpose the seat back is coupled with the actuation lever 109 via a Bowden cable, that has a cable 121b, and its Bowden housing (not depicted) is supported by the floor support 121. Furthermore, a drive component 122 is mounted by means of an axle stump 124 on the swivel axle of the actuation lever 109 which has a guide 122a as well as a connecting device 122b for the cable 121b of the Bowden cable. This drive component 122 converts a tightening of the cable 121b during the forward tilting of the seat back into a swivel motion which, in turn, is transferred to the actuation lever 109 by two arms 123 of the drive which embrace it. Thus, when the seat back is tilted forward, the actuation lever 109 swivels clockwise and releases the fixing device 120 via the actuation element 120b.

Furthermore, on the cable 121b of the Bowden cable, a cable nipple 168 is attached between the Bowden support 121, which is attached by means of an attachment tab 121a to the seat rail and the drive 122, by crimping, for example. Associated with the cable nipple 168 is a switching element in the form of a switch lever 106, which, by means of a bearing bushing 165, a step bolt 165a as well as a screw 166 is swivelably supported around an axle formed by the longitudinal axis of the step bolt 165a and also attached to the seat frame or to its seat rail 102. The switch lever 106 has, in an upper section 161, a stop 162 which is arranged immediately next to the cable nipple 168 and upon which the cable nipple 168 can act in the longitudinal direction of the seat thereby swiveling the switch lever 106.

The second end section of the switch lever 106 arranged below the bearing bushing 165 as well as the step bolt 165 forms an actuation section 160 that is associated with an actuation section of a locking catch 104 of the memory device. The actuation section of the locking catch 104 is formed by an actuation surface 140 on the upper side of the locking catch.

The switch lever 106 is arrested here by an extension 191 of the actuation lever 109 upon which the upper section 161 of the switch lever 106 is supported vertically (transverse to the longitudinal seat direction L) by means of a stop 163 in the position depicted in FIGS. 6 and 6a, in which its actuation section 160 acts on the actuation surface 140 of the locking catch 104. The torque necessary here is applied by the spring arrangement 120a of the fixing device 120 which acts on the lever extension 191 via the actuation element 120b as well as the actuation lever 109.

Alternatively, or additionally, the vertical position of the switch lever 106 can be supported by means of a spring directly adjacent to the switch lever 106 or supported in that the switch lever 106 is mounted with sufficient friction that cannot be overcome by the action of the pressure spring 400 of the locking catch 104.

The locking catch 104 itself, as is specifically discernible in FIG. 6a, is supported swivelably on a pivot pin 155 of a glider 105 that is guided moveably in the longitudinal direction of the seat L with a basic element 150 guided abutting the arresting openings 170 of the arresting rail 107. In its basic element 150, the glider has a recess 152 in which the pressure spring 400 is arranged which acts on the locking catch 104 below the actuation surface 140 of the locking catch 104 and thus pre-tensions the locking catch such that an arresting hook 141 arranged at the other end of the locking catch 104 has the tendency to engage in the arresting rail 107. In the state depicted in FIGS. 6 and 6a in which the seat is locked into the memory position with its seat back not tilted forward, the locking catch is blocked in that the actuation section 160 of the switch lever 106 is supported on the actuation surface 140 of the locking catch 104 such that it cannot swivel around the pivot pin 155 to engage the arresting hook 141 with the arresting rail 107.

In the state depicted in FIGS. 6 and 6a, a counterstop 144 of the locking catch 104 furthermore is in contact with a stop 132 of a stop element 103 that is attached to the seat rail 102 by means of mounting screws 136. Furthermore, an engaging piece 143 of the locking catch 104, which piece connects upward to the stop 144, is engaged in the engagement area 134 of the stop element 103.

If, in the state of the seat depicted in FIGS. 6 and 6a, in which it is locked in the memory position with the seat back tilted forward, then the cable 121b of the Bowden cable is tensioned and moves in the direction of the rear end (seat back side) of the seat.

Figure 7:
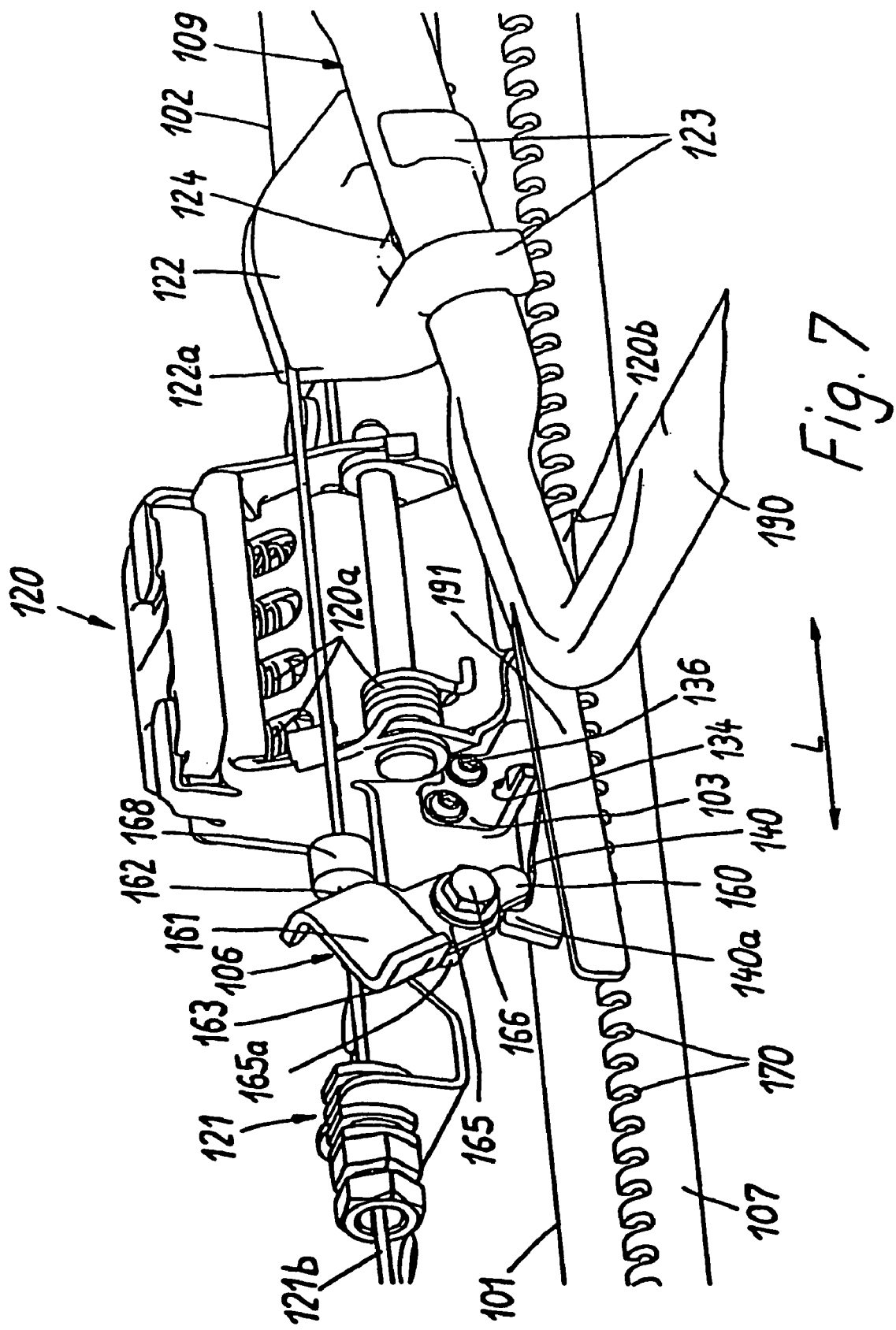
FIG. 7 is a view according to FIG. 6 in a state in which the seat back is tilted forward in order to be able to displace the seat with its seat back tilted forward.

According to FIG. 7, this causes the counter-clockwise swivelling of the actuation lever 109 via the drive component 122 as well as the arm 123 thereby acting on the actuation element 120b and releasing the fixing device 120. Furthermore, the cable nipple 168 crimped to the cable 121b moves in the direction of the rear end of the seat thus acting on the stop 162 in the upper section 161 of the switch lever 106. This swivels the actuation lever 106 counter-clockwise, whereby its actuation section 160 is lifted off the locking catch 104 by the associated actuation surface 140. This swiveling motion of the switch lever 106 is possible because it is no longer blocked by the lever extension 191 which had been swivelled downward together with the actuation lever 109. As a result of the fact that the switch lever 109 released the locking catch 104, now, due to the action of the pressure spring 400 (cf. FIG. 6a) the catch swivels around the pivot pin 155 of the glider 105 until the arresting hook 141 engages in an opening 170 of the arresting rail 107. This locks the locking catch 104 and thus the entire memory device.

The swiveling motion of the locking catch 104 further results in the fact that the engaging piece 143 of the locking catch 104 as well as the engaging section 134 of the stop element 103 disengaged. This is necessary to enable moving the seat frame since, otherwise, movement of the seat would be blocked by the locked memory device.

Here, the cable nipple 168 serves as a blocking means which, when the seat back is tilted forward, acts on the switch lever 106 such that the locking catch 104 cannot be released by means of the switch lever 106.

The arrangement is designed such that the arresting hook 141, acted upon by the pressure spring 400, can engage in an arresting opening 170 already when the seat back is tilted forward before the fixing device 120 is released enough that the seat rail 102 is moveable with respect to the rail 101 fixedly attached to the car body. This assures a reliable storage of the current longitudinal seat position as the memory position. However, insofar as the arresting hook 141 cannot immediately engage an arresting opening 170 because the seat is positioned such that the arresting hook 141 strikes a rib between two arresting openings 170 due to the action of the pressure spring 400, and the arresting hook 141 catches in the next arresting opening 170 it passes only after a slight displacement of the seat frame in the longitudinal seat direction L. In such a case, a slight deviation between the longitudinal seat position during the tilting forward of the seat back and the subsequently stored memory position results.

In the state depicted in FIG. 7 that resulted from the tilting forward of the seat back, the seat frame with seat back tilted forward can now be moved forward in the longitudinal seat direction L in order to facilitate the entry of a passenger or the moving of an object into the back of a motor vehicle.

If the seat is then moved back again with the seat back tilted forward, it is automatically stopped by the arresting catch 104 no later than in the defined memory position. This is because upon reaching the memory position, the stop 132 of the seat frame makes contact with the stop 144 of the memory device, thereby preventing further displacement of the seat frame toward the rear.

Then, if the seat back is tilted into its use position again, the tension of the cable 121b is released and the switch lever 106 as well as the actuation lever 109 with its extension 191 attached to it return to the state depicted in FIGS. 6 and 6a. If, subsequently, the actuation lever 109 is swivelled counter-clockwise in order to release the fixing device 120, the state depicted in FIG. 8 occurs.

With manual swiveling of the actuation lever 109 by means of an actuation handle provided for this, the fixing device 120 is, of course, released by means of the actuation element 120b such that the seat frame can be moved in the longitudinal direction of the seat L on the rail 101 fixedly attached to the car body; however, in this situation—in contrast to tilting the seat back forward—the switch lever 106 remains in its vertical position in which its actuation section 160 acts vertically on the actuation surface 140. This prevents the locking catch 104 from being locked due to the action of the pressure spring 400.

Figure 8:
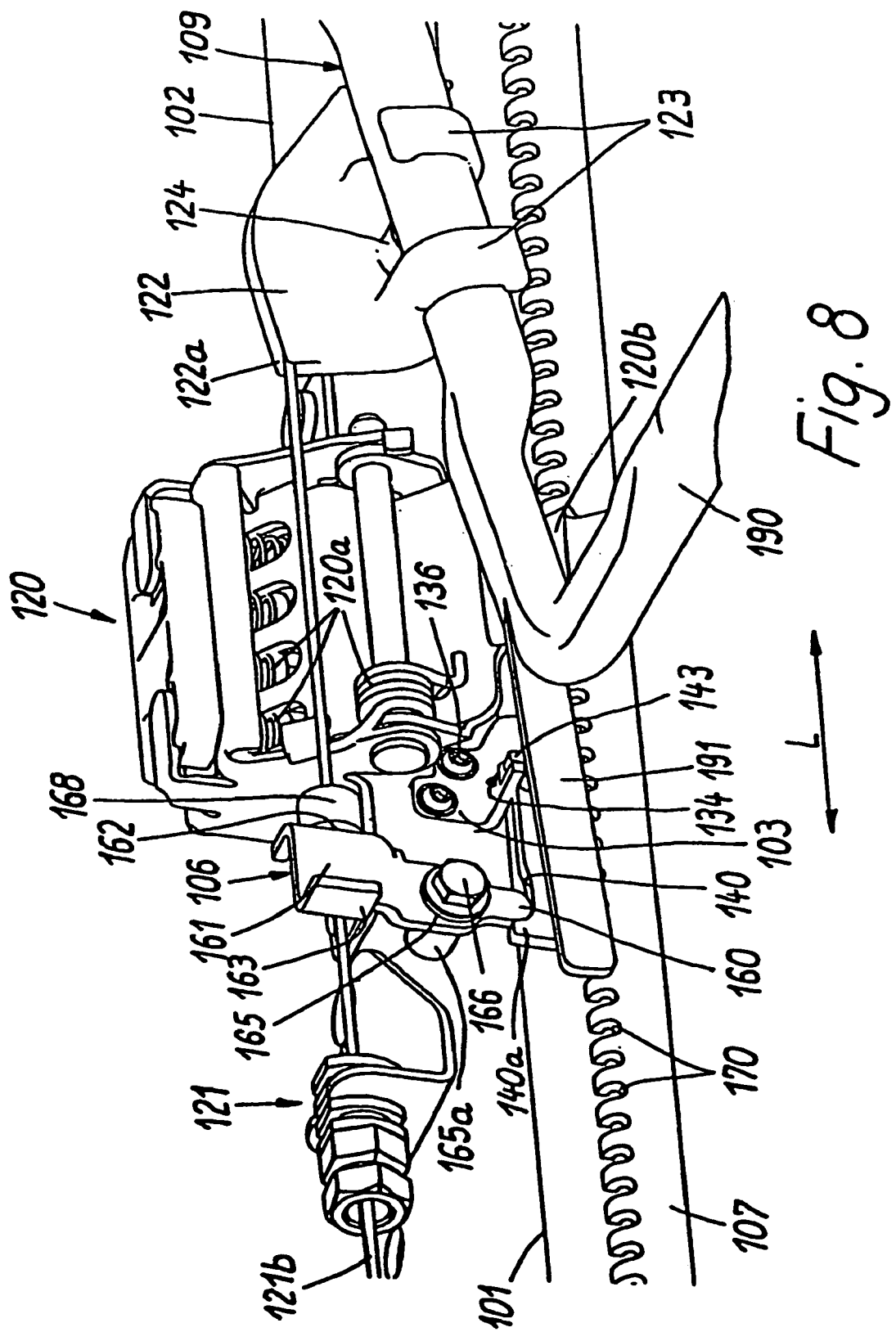
FIG. 8 is a view according to FIG. 6 in a state in which the actuation lever was activated in the memory position while the seat back was in a tilted-up position in order to readjust the memory position.

Because of the lever extension 191 swiveled downward according to FIG. 8, and, accordingly, not abutting the associated stop 163 of the switch lever 106, the vertical position of the switch lever 106 must be secured, for example, by a suitable design of the actuation surface 140 of the arresting catch 104. For this, the actuation surface 140 may be curved such that it exerts no torque due to the effect of the pressure spring 400 of the arresting catch 104 on the actuation section 160 of the switch lever 106, which would result in a counter-clockwise swivel moment of the switch lever 106. In other words, the interplay of the actuation surface 140 of the arresting catch 104 with the actuation section 160 of the switch lever 106 must be designed such that the forces introduced by the arresting catch 104 through the pressure spring 400 do not trigger a counter-clockwise swivel motion of the switch lever 106. A clockwise swivel motion of the switch lever 106 is blocked by the cable nipple 168.

Alternatively, the vertical position of the switch lever 106—as mentioned above—can also be secured by means of a suitable spring element or sufficiently strong friction forces.

In summary, the actuation of the actuation lever 109 in the memory position of the seat (with seat back not tilted forward) results, on the one hand, in that the fixing device 120 is released, whereas, at the same time, the arresting catch 104, and thus the memory device as a whole remains in the locked position that already existed before the swivelling of the actuation lever 109; cf. FIGS. 6 and 6a. Furthermore, the engaging piece 143 of the memory device engages in the engagement area 134 of the arresting element 103 on the seat rail side.

In this state, a displacement of the seat frame in the longitudinal direction of the seat L results in that the arresting catch 104 is at the same time carried along such that a new memory position is also set when the seat is displaced. The newly set memory position that corresponds to the newly set longitudinal seat position resulting from the displacement of the seat frame will, however, not yet be locked when the actuation lever 109 is released. Because, according to FIGS. 6 and 6a, this initially only causes the fixing device 120 to be locked and thus the seat rail 102 arrested relative to the rail 101 fixedly mounted to the car body. In contrast, a locking of the memory device results, according to FIG. 7, only when the seat back is tilted forward in the new longitudinal seat position. Accordingly, in this exemplary embodiment, the memory device is locked only when the seat is displaced forward with the seat back tilted forward within the framework of this easy-entry function.

Figure 9:
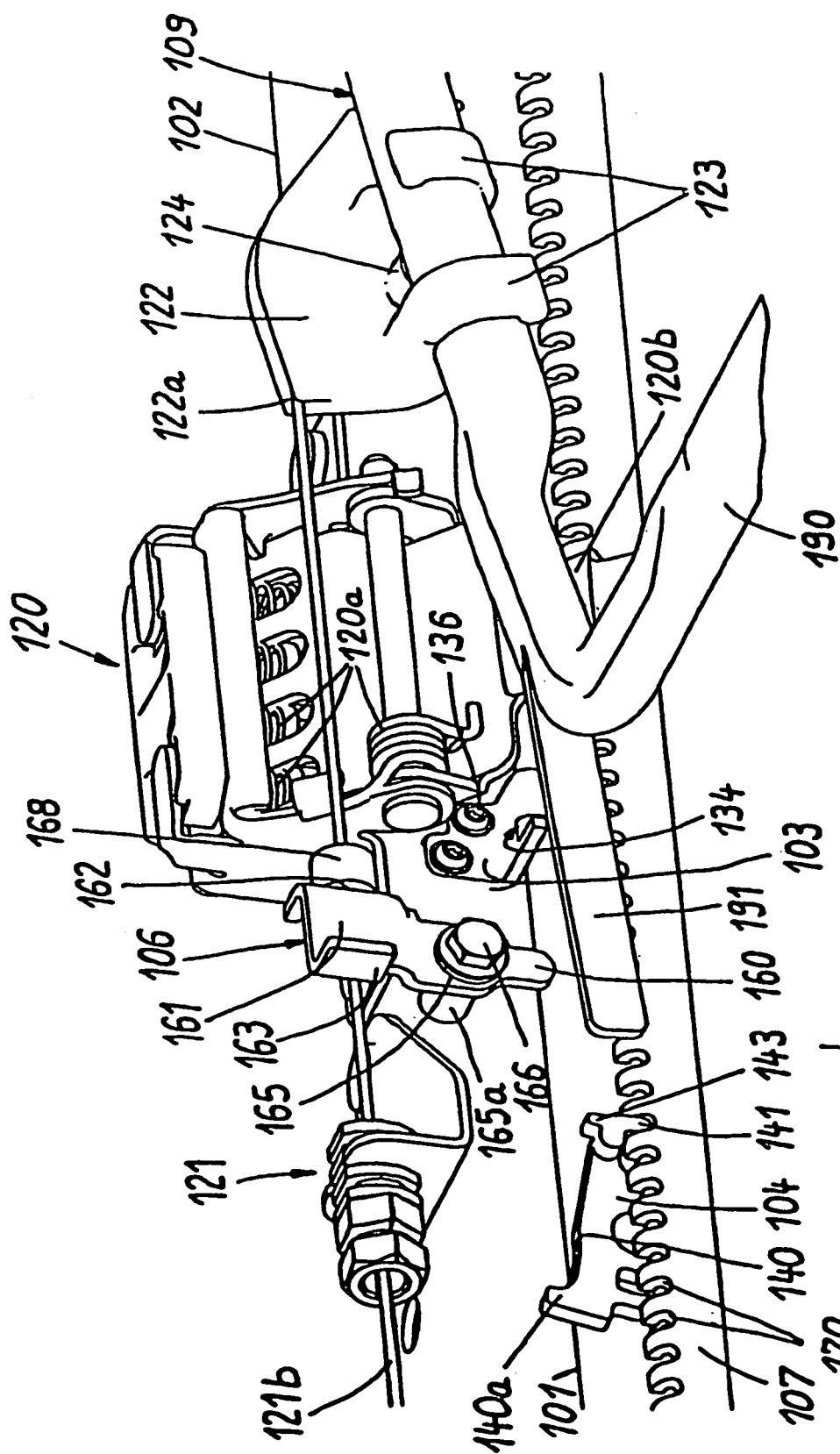
FIG. 9 is a view according to FIG. 6 in a state in which the memory position of the seat is approached with the seat back tilted up.

FIG. 9 depicts the seat frame after it was first displaced forward in the longitudinal seat direction L with the seat back tilted forward, whereby the arresting catch 104 was left locked in the original seat position and after the seat back was subsequently tilted back again into its use position. Furthermore, the actuation lever 109 is swivelled such that the fixing device 120 is released and that the seat frame can be adjusted forward or backwards according to choice. In every longitudinal seat position that is reached hereby, by releasing the actuation lever 109, the seat frame can be arrested with regard to the rail 101 fixedly attached to the car body by means of the fixing device 120.

Figure 10:
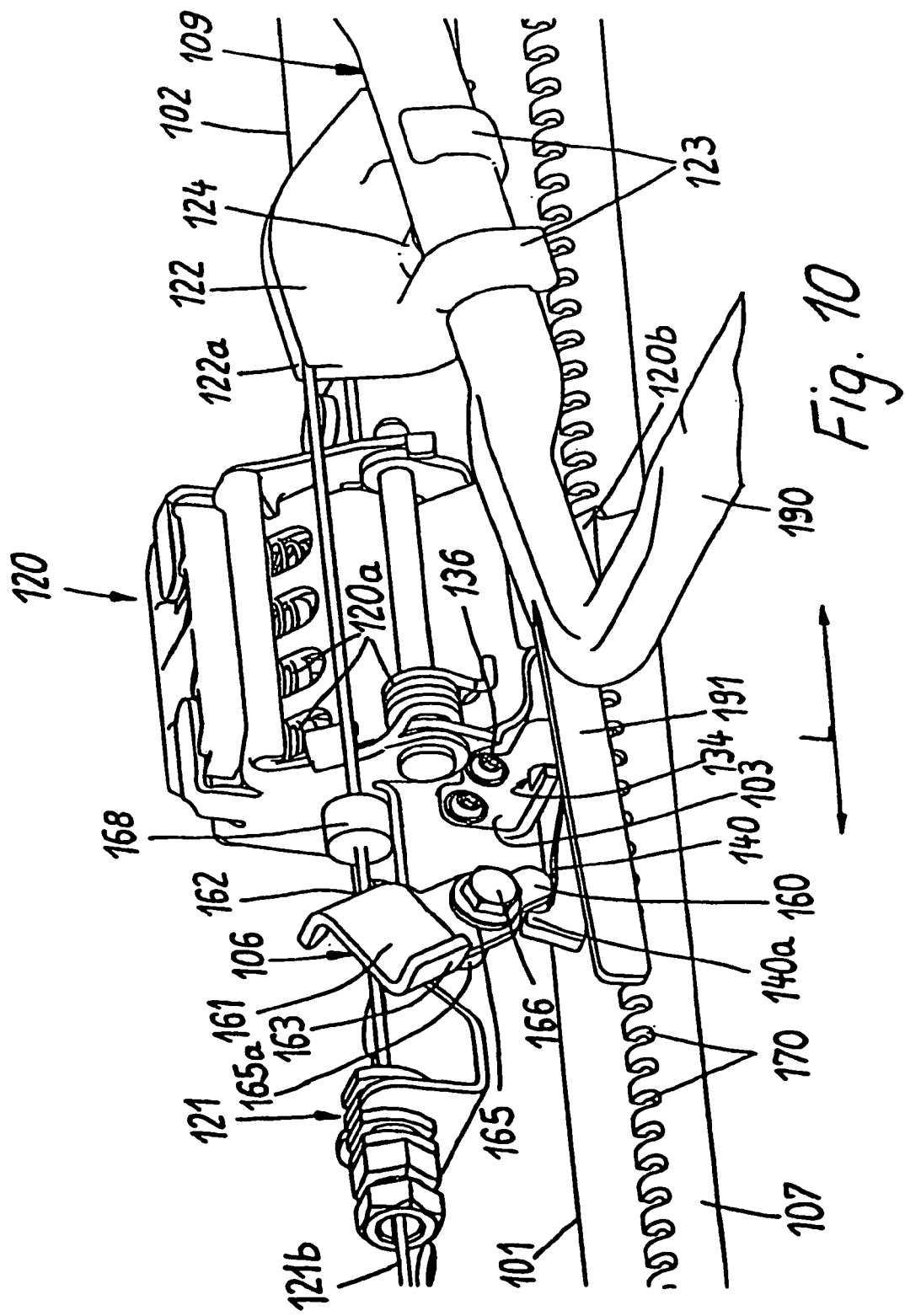
FIG. 10 is a view according to FIG. 6 in a state in which the memory position of the seat is reached with the seat back tilted up.

And finally, FIG. 10 finally the state of the seat frame when it is moved all the way back into the memory position with the seat back upright. The switch lever 106 strikes, with its actuation section 160, a projection 140a which projects vertically upward from the actuation surface 140 of the arresting catch 104. The reason for this is that the arresting catch 104 is in the locked position with its arresting hook 141 (cf. FIG. 6a) engaged in an arresting opening 170 of the arresting rail 107. Due to the associated oblique position of the actuation surface 140 of the arresting catch 104, it exerts a torsional moment with a component parallel to the longitudinal seat direction L on the actuation section 160 of the switch lever 106. As a consequence, the switch lever 106 is swivelled counter-clockwise and its actuation section 160 comes into arresting contact with the projection 140a of the arresting catch 104. This has the effect, that the arresting catch 104 still remains locked when the seat frame reaches the memory position depicted in FIG. 10.

In summary, accordingly, the actuation surface 140 thus works together with the actuation section 160 of the switch lever 106 in the locked state of the arresting catch 104 such that it is swivelled when the seat with upright seat back is moved into the memory position, thereby preventing a release of the arresting catch 104. (If the seat is moved back into the memory position with the seat back tilted forward, the switch lever 106 is swivelled anyway due to the action of the cable nipple 168, cf. FIG. 7, such that no release of the memory device can take place in this case as well.) On the other hand, the actuation surface 140 of the arresting catch 104 and the actuation section 160 of the switch lever 106 in locked position of the arresting catch 104, cf. FIG. 6, work together such that the arresting catch 104 remains released, as was explained above in detail with reference to FIG. 6.

The seat frame is automatically stopped due to the locked position of the arresting catch 104 when it reaches the memory position when the stop 132 of the seat frame side stop element 103 runs into the counterstop 144 of the memory device (cf. FIG. 6a).

If the actuation lever 109 is released now, it is swivelled clockwise due to the action of the spring arrangement 120a of the fixing device 120 until the fixing device 120 is locked again. At the same time, the extension 191 of the actuation lever 109 that acts on the bent stop 163 in the upper section 161 of the switch lever 106 is swivelled clockwise into its vertical position, whereby the switch lever 106 acts with its actuation section 160 on the actuation surface 140 of the arresting catch 104 (against the action of the pressure spring 400) and releases it (which requires an appropriate design of the spring arrangement 120a). The seat then is again located in the memory position with the seat back tilted up as in the state explained with reference to FIGS. 6 and 6a.

A further development of the known motor vehicle seat, previously described with reference to FIGS. 6 through 11, is now explained with reference to FIGS. 1a through 3. Here, the motor vehicle seat and its seat frame depicted in FIGS. 1a through 3, substantially match the motor vehicle seat described with reference to FIGS. 6 through 11 with regard to the design of the longitudinal rail guide 101, 102, with regard to the design of the fixing device 120 as well as with regard to the design of the memory device 104, 105, 107. Consequently, these characteristics are not further discussed. Instead, reference is made in this regard to the previous explanations of FIG. 6 though 11, whereby the necessary relationships are established by the use of matching reference characters for components corresponding to each other in FIGS. 1a through 3, on the one hand, and in FIGS. 6 through 11, on the other.

The essential characteristic features of the arrangement depicted in FIGS. 1a through 3 are found in the design of an engaging piece and an associated locking element that enable automatic resetting of the memory position when the seat frame is adjusted with the seat back tilted up (seat back in use position) and which prevent resetting of the memory position if the motor vehicle seat is displaced with the seat back tilted forward onto the seat surface for the execution of the easy-entry function. In the following, these two function groups are described in further detail with reference to FIGS. 1a through 3.

FIG. 1a depicts a perspective view of a longitudinal seat guide 101, 102 comprising a subrail 101 to be arranged fixedly to the car body as well as an upper rail 102 supporting the seat frame. This longitudinal guide 101, 102 allows an adjustment of the longitudinal seat position (position of the seat frame in the longitudinal seat direction L).

To lock a previously set longitudinal seat position, a fixing device 120 with elastic pre-tensioned locking teeth Z is provided which is arranged on the seat-side upper rail 102 (seat rail) and whose locking teeth Z can engage in associated arresting openings of the subrail fixedly attached to the car body to lock the two rails 101, 102. Due to the elastic reloading of the locking teeth Z in the direction of the associated arresting openings, the fixing device 120 has the tendency to lock the two rails 101, 102 to each other unless they are released by the action of an actuation element 120b (cf. FIGS. 7 through 10) specifically provided for this purpose. This action can—as explained above with reference to FIGS. 6 through 11—take place, on the one hand, through the direct release of the fixing device by means of a suitable actuation lever or indirectly by the forward tilting of the seat back for the triggering of the easy-entry function.

Figure 1B:
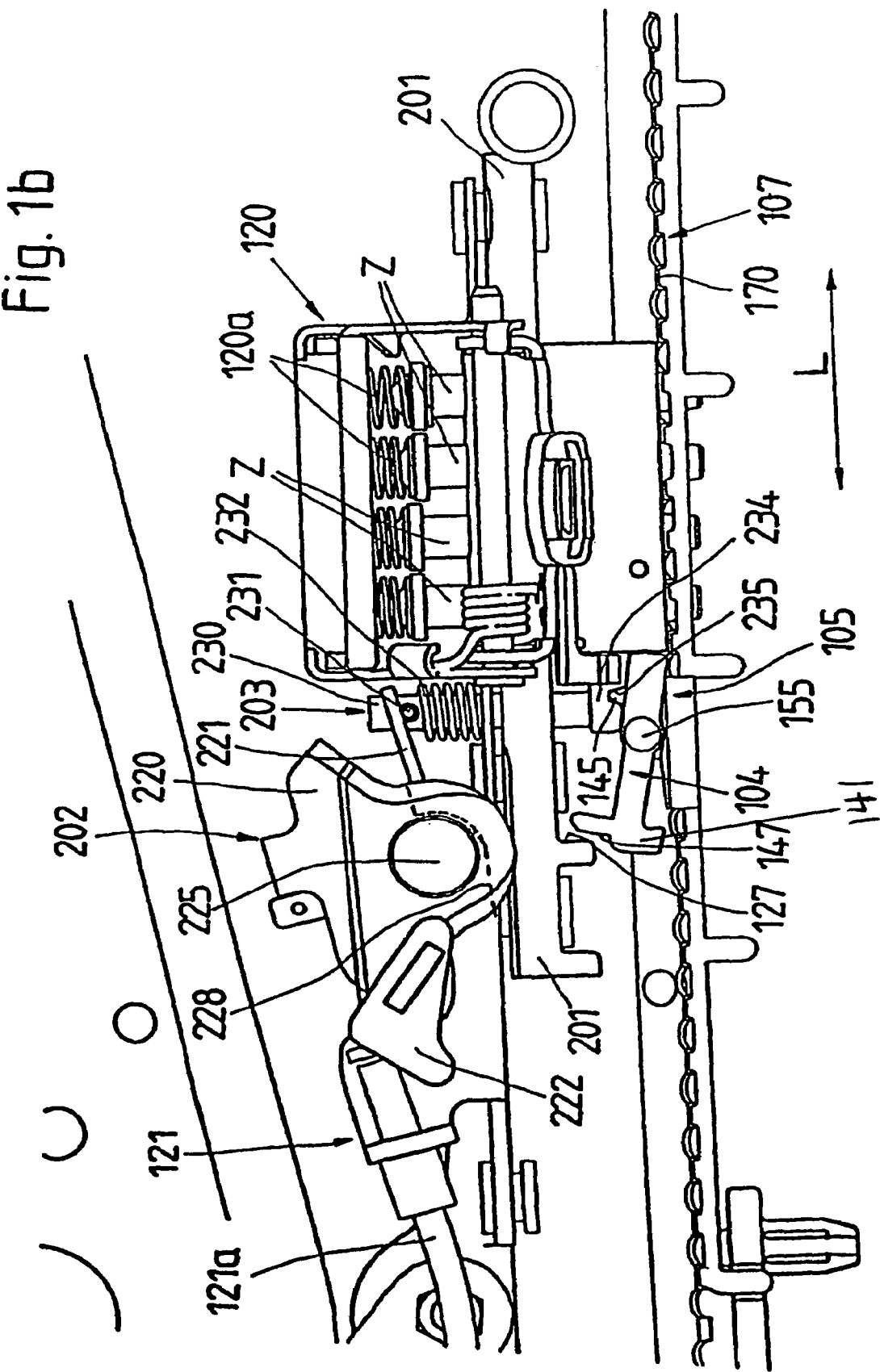
FIG. 1b is a view according to FIG. 1a, in which the rails of the longitudinal seat guides are not shown.

Furthermore, referring to FIG. 1a and, in particular, to FIG. 1b, in which the rails 101, 102 are not depicted, the essential components of a memory device 104, 105, 107 are discernible, i.e., a glider 105, an arresting catch 104 swivelably arranged on the glider 105 as well as an arresting rail 107 provided with arresting openings 170, into which an arresting hook 141 of the arresting catch 104 can engage in order to lock a previously set memory position. Reference is made again in this regard to more detailed explanations of the embodiments in FIGS. 6 through 11.

FIGS. 1a and 1b depict a section of the embodiment of the seat frame according to the invention in a state in which the seat with the seat back tilted up (in its use position) is locked in a memory position by means of the fixing device 120.

In this state, the arresting catch 104 of the memory device is acted on by an engaging device 203 such that the arresting catch 104 with its arresting hook 141 is lifted out of the arresting rail 107. The engaging piece 203 is arranged longitudinally displaceable on the seat rail 102 or on a holding component 201 attached to the seat rail 102 and includes a longitudinally extending basic element 230, on whose lower end facing the arresting catch 104 an engaging element 234 with an engaging opening 235 is formed or attached. This engaging piece 203 is pretensioned by means of an elastic element 232 in the form of a pressure spring (return spring) that is supported on the one hand by the holding element 201 and on the other by a projection 231 protruding from the basic element 230 of the engaging piece 203 in the direction away from the arresting catch 104, such that it has a tendency to lift off from the arresting catch 104. This, however, is prevented by a locking element 221 on the basic element 220 of a lever 202 mounted swivelably around an axle 225, which lever is pretensioned in the direction of the projection 231 of the engaging piece 203, by means of a spring element 228 in the form of a torsion spring such that the locking element 221 presses the engaging piece onto the arresting catch against the action of the elastic element 232 provided on the engaging piece such that the arresting hook 141 of the arresting catch 104 is lifted from the arresting rail 107. Thus, a projection 145 of the arresting catch 104 designed as a latch engages in the engaging piece opening 235 of the engaging piece 203.

This is achieved in that the locking element 221 pretensioned by means of the torsion spring 228 exerts a force on the engaging piece 203 in the direction of the arresting catch 203 that is greater than the force exerted in the opposite direction because of the pressure spring 232. Consequently, the arresting hook 141 is lifted out of the arresting openings 170 of the arresting rail 107 and the arresting catch 104 can be engaged during displacement of the seat in the longitudinal direction L with the seat back tilted up, such that the memory position is reset at the same time during displacement of the seat.

If, in the state of the seat depicted in FIGS. 1a and 1b, the seat back is tilted forward in the direction of the seat surface, this causes tension to the core 121a of a Bowden cable 121a, 121b that is connected by one end to the seat back and by the other end to the basic element 220 of the swivelably mounted lever 202. Thus, the lever 202 is twisted such that the locking element 221 is lifted off the projection 231 of the engaging piece 203 and the engaging piece 203 is lifted off the arresting catch 104 by under the action of the pressure spring 232. Since the arresting catch 104—as explained with reference to FIGS. 6 through 10—is again pretensioned by means of a spring element such that the arresting hook 141 of the arresting catch 104 has the tendency to engage in one of the arresting openings 170 of the arresting rail 107, the arresting catch 104 is locked in its current position. This corresponds to a complete locking of the memory device 104, 105, 107. This state is depicted in FIG. 2.

The mechanism is preferably designed such that the locking of the memory device 104, 105, 107 takes place with a forward tilting of the seat back by 20° to 40° from a vertical use position. The locking of the memory device accordingly takes place already during the first phase of the activation of the easy-entry mechanism by the forward tilting of the seat back in the direction of the seat surface. The fixing device 120 is still locked in this first phase of the forward tilting of the seat back thus preventing a displacement of the seat in the longitudinal direction L.

This is made possible only with an additional forward tilting of the seat back, whereby, according to FIG. 3, an actuation section 222 provided on the swivelably supported lever 202 acts—as depicted in FIGS. 7 through 10—on the actuation lever 109 of the fixing device 120, such that the fixing device 120 is released. This then allows a displacement of the seat in the longitudinal direction L.

Accordingly, a displacement of the seat in the longitudinal direction L with a seat back tilting forward for the execution of the easy-entry function is possible only after the arresting catch 104 of the memory device 104, 105, 107 has been locked. Thus, the memory position existing at the time of the forward tilting of the seat back is reliably fixed before a displacement of the seat with the seat back tilted forward can take place. As explained above with reference to FIGS. 6 through 10, this memory position can also be found during the subsequent moving back of the seat. This thus prevents a displacement of the seat with the seat back tilting forward when executing the easy-entry function from being able to occur before the starting position of the seat is fixed as memory position.

The entire arrangement is very compact because of the displaceability of the engaging piece 203 substantially horizontal with reference to the extending direction L of the longitudinal seat guide and because of the swivelable support of the lever 202 with the arresting element 221 and is substantially located in the space surrounded by the rails 101, 102 of the longitudinal guide of the rails, or, it extends beyond this space only upward.

If, according to FIGS. 1a through 3, the seat back of the seat is tilted forward in order to trigger the easy-entry function, the problem may occur that the arresting hook 141 of the arresting catch 104 cannot engage in one of the arresting openings 170 of the arresting rail 107. The fixing device 120 as a rule allows for a continuous adjustment of the longitudinal seat position, cf, for example, the fixing device disclosed in DE 229 10 720 U1, whereas, here, a finely stepped locking (not continuous) (using the arresting rail 107 with arresting openings 170) is provided for the locking of the memory position. The situation may thus occur that the arresting hook 141 of the arresting catch 104 is unable to engage in an arresting opening 170 during the forward tilting of the seat back, but stands on its edge. Therefore, initially a locking of the memory position is impossible.

If the seat frame and thus the seat rail 102 are displaced from the memory position in the longitudinal seat direction with the seat back tilted forward (easy-entry), the arresting catch 104 together with the glider 105 is carried along a short distance farther since a stop 127 provided on the seat rail acts on a associated arresting stop 147 on the catch side. The arresting catch 104 and the glider 105 are carried along only until the arresting hook 141 of the arresting catch 104 can fully engage in the next positioned arresting opening 170 of the arresting rail 107, under the action of the spring element provided on the arresting catch. The arresting catch 104 and thus the fixing device 104, 107 of the memory device 104, 105, 107 as a whole are thus locked into the memory position closest to the longitudinal seat position in which the fixing device 120 was locked before the seat back was tilted forward.

In the locking state, in which the arresting hook a 141 of the arresting catch 104 engages in an arresting opening 170 of the arresting rail 107, the arresting stop 147 on the catch side is located below the stop 127 on the seat rail side such that these stops 127, 147 can no longer engage in an operational connection with each other. The seat then can be displaced further forward in the longitudinal seat direction L whereby the arresting catch 104 and the glider 105 remain in the previously locked memory position.

FIGS. 4a through 4d depict the arrangement from FIGS. 1a and 1b in various views, whereby, additionally, a device is provided that prevents a locking of the fixing device 120 with the seat back tilted forward (according to FIGS. 4e through 4g) and beyond the memory position.

The arrangement depicted in FIGS. 4a through 4d has, corresponding to FIGS. 1a and 1b, a rail 101 on the car body side, a seat rail 102 guided on it, a fixing device 120 of the longitudinal seat guide, a Bowden cable 121a, 121b with a Bowden support 121 for the coupling of the fixing device 120 to the seat back and a memory device 104, 105, 107. An actuation lever 109 actuates the fixing device 120 as it can be actuated directly by hand or by a lever extension 191 and the Bowden cable 121a, 121b by tilting the seat back forward to release of the fixing device 120. For the coupling of the Bowden cable 121a, 121b to the lever extension 191, a lever 202, swivelably mounted around its axle 225, on whose basic element 220 one end of the core 121b of the Bowden cable 121a, 121b is attached and which acts on the lever extension 191 with an actuation section 222 when the seat back tilts forward thus tightening the core of the Bowden cable 121 and swivelling the lever 202 counterclockwise.

In the area in which it works together with the actuation section 222 of the lever 202, the lever extension 191 has a convexity 192 for overlifting compensation, whose function will be described below with reference to FIGS. 4e through 4g.

On the backside of the arrangement depicted in FIGS. 4a through 4d a blocking element 204 is swivelably mounted around an axle 240 on the seat rail 102 whereby one lever arm 241 is connected by means of a tension spring 245 attached by one end to a spring connector 247 arranged on the seat rail 102, such that the blocking element 204 is elastically pretensioned in one rotational direction (counterclockwise). The other lever arm 242 of the blocking element 204 forms a stop 244 that cooperates with an associated stop 224 of the lever 202 after the seat back is tilted forward—cf. FIGS. 4e through 4g. In the use position of the seat back (according to the depiction in FIGS. 4a through 4d), this other lever arm 242 of the blocking element 204 furthermore prevents a swivelling motion of the blocking element 204 under the action of the pretensioning of the spring, in that it rests on the stop 224 of the lever 202.

If the seat back of the motor vehicle seat is now tilted forward to trigger the easy-entry function and the seat displaced forward, the lever 202 swivels due to the tightening of the core 121b of the Bowden cable 121a, 121b during the tilting forward—as explained with reference to FIGS. 1a through 3—of the seat back. This releases the blocking element 204 and it swivels under action of the pretension applied by the tension spring 245 such that it rests with its stop 244 against the associated stop 224 of the lever 202. This causes the arresting of the lever 202 in its swivelled position caused by the tightening of the core 121b and the fixing device 120 is thus durably released, since the lever 202 according to FIG. 4e in its swivelled position effects a swivelling of the actuation lever 109 and thus a release of the fixing device 120 due to the action of its actuation section 222 on the lever extension 191.

This released state of the fixing device 120 is here arrested by the action of the stop 244 of the blocking element 204 such that no locking of the fixing device 120 is possible as long as the seat frame is located outside the memory position with the seat back tilted forward.

Figure 4A:
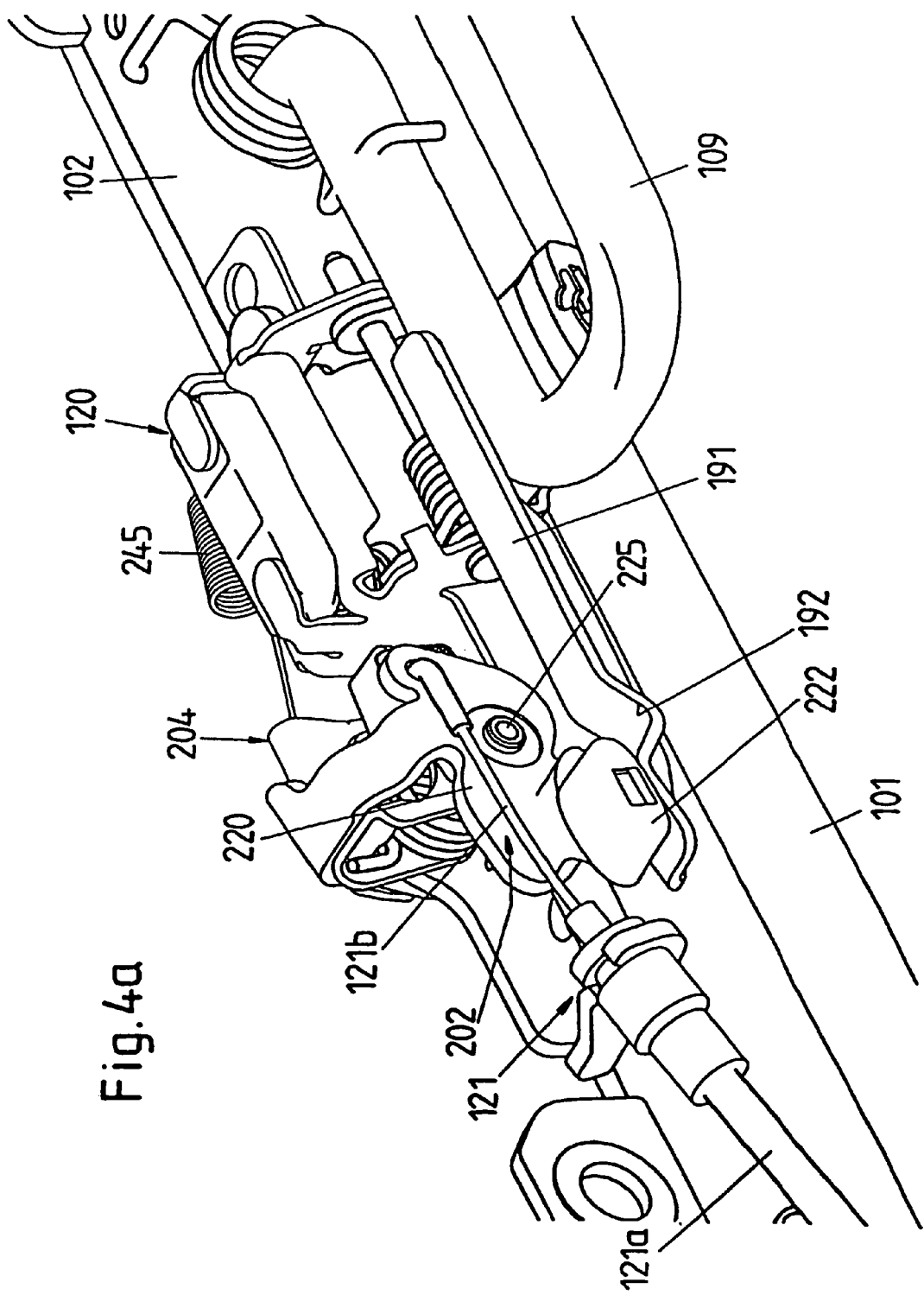
FIG. 4a is a perspective view of an arrangement according to FIG. 1a, on the back of which an additional device is provided that prevents a locking of the fixing device of the longitudinal seat guide outside of the memory position while the seat back is tilted forward.
Figure 4C:
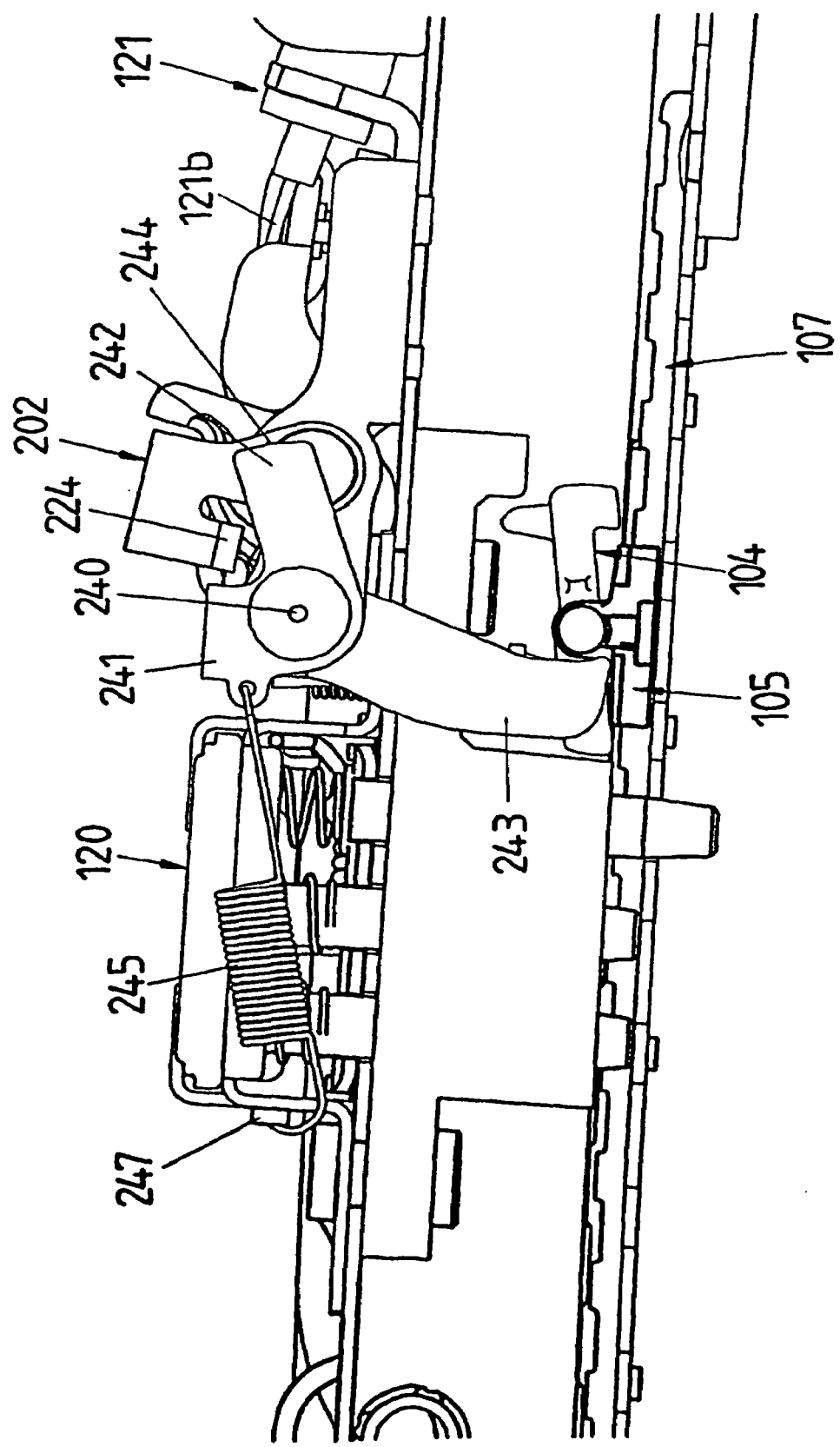
FIGS. 4c and 4d are two additional rear views of the arrangement from FIG. 4a, in which the rails of the longitudinal guides are only partially shown.
Figure 4D:
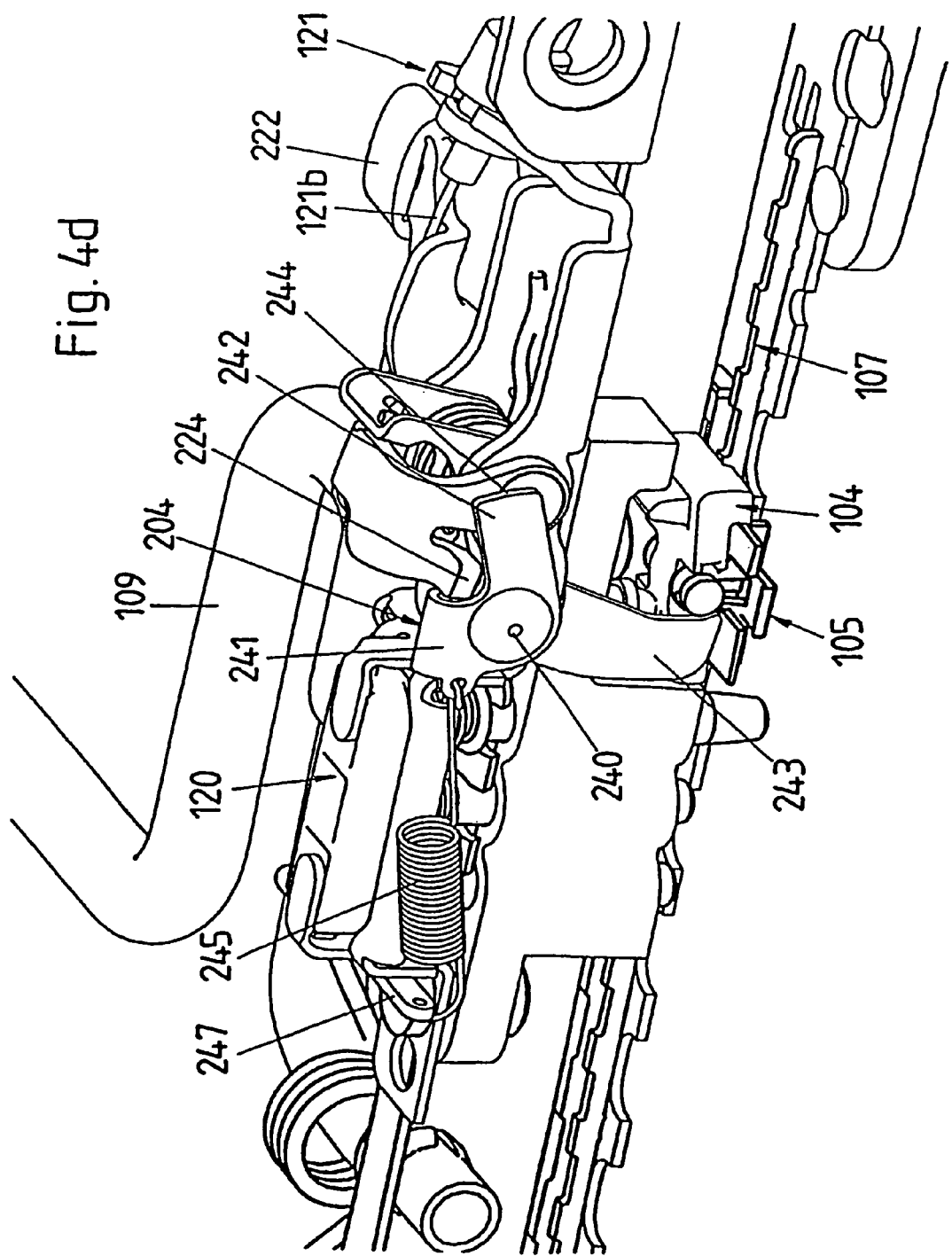
Figure 4E:
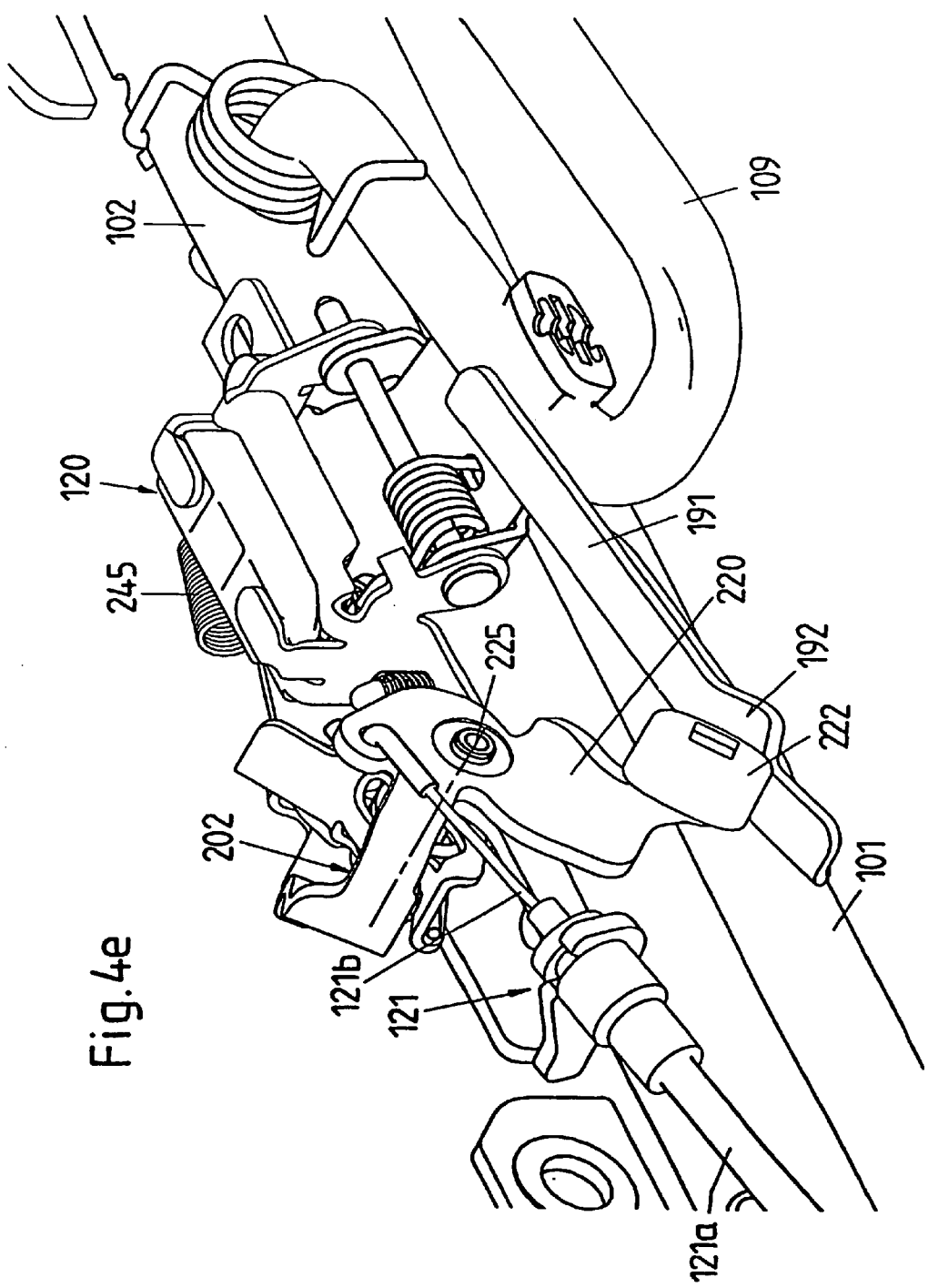
FIG. 4e is a view of the arrangement according to FIG. 4a with the seat back tilted forward.
Figure 4F:
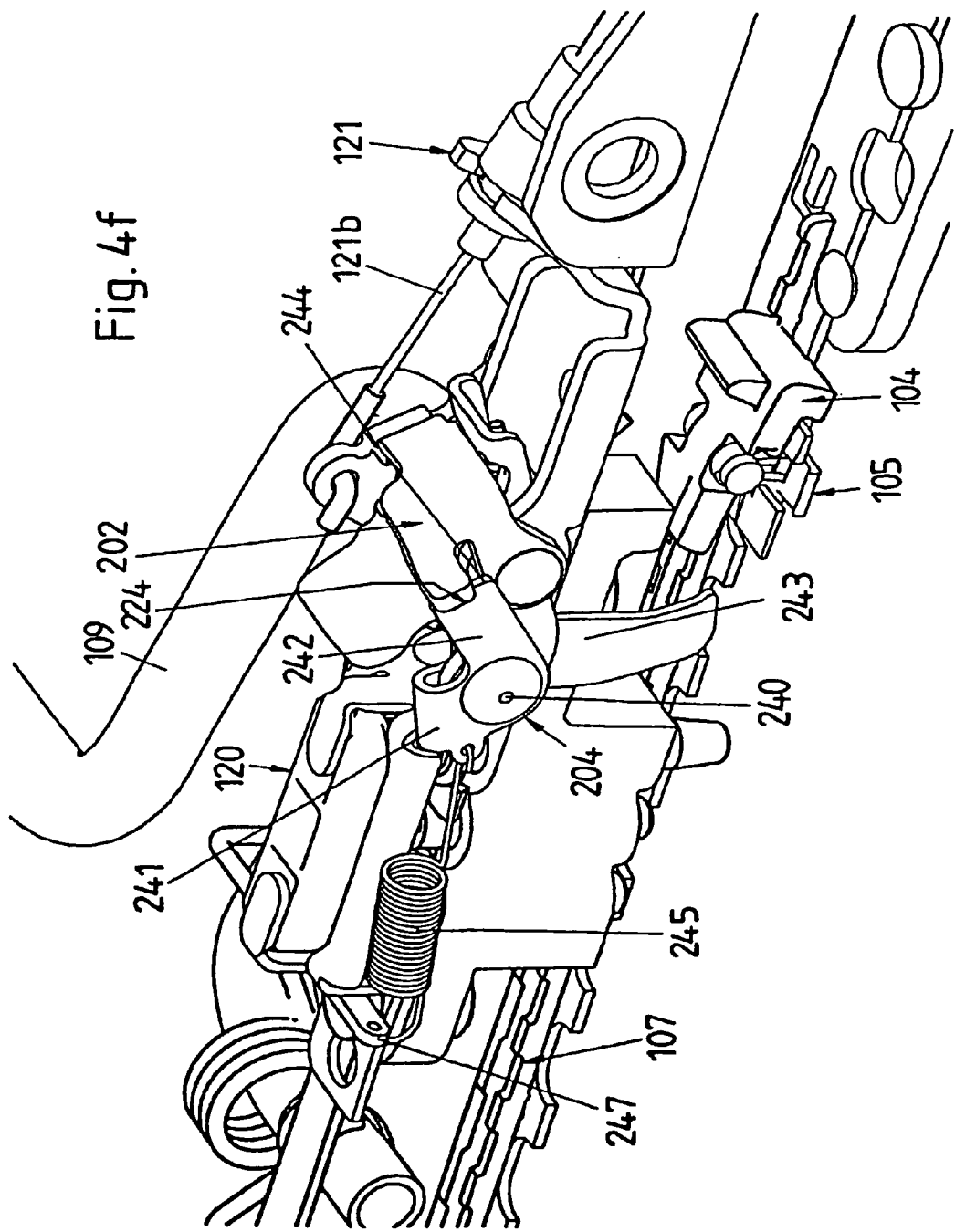
FIGS. 4f and 4g are views of the arrangement according to FIGS. 4b and 4c with the seat back tilted forward.
Figure 4G:
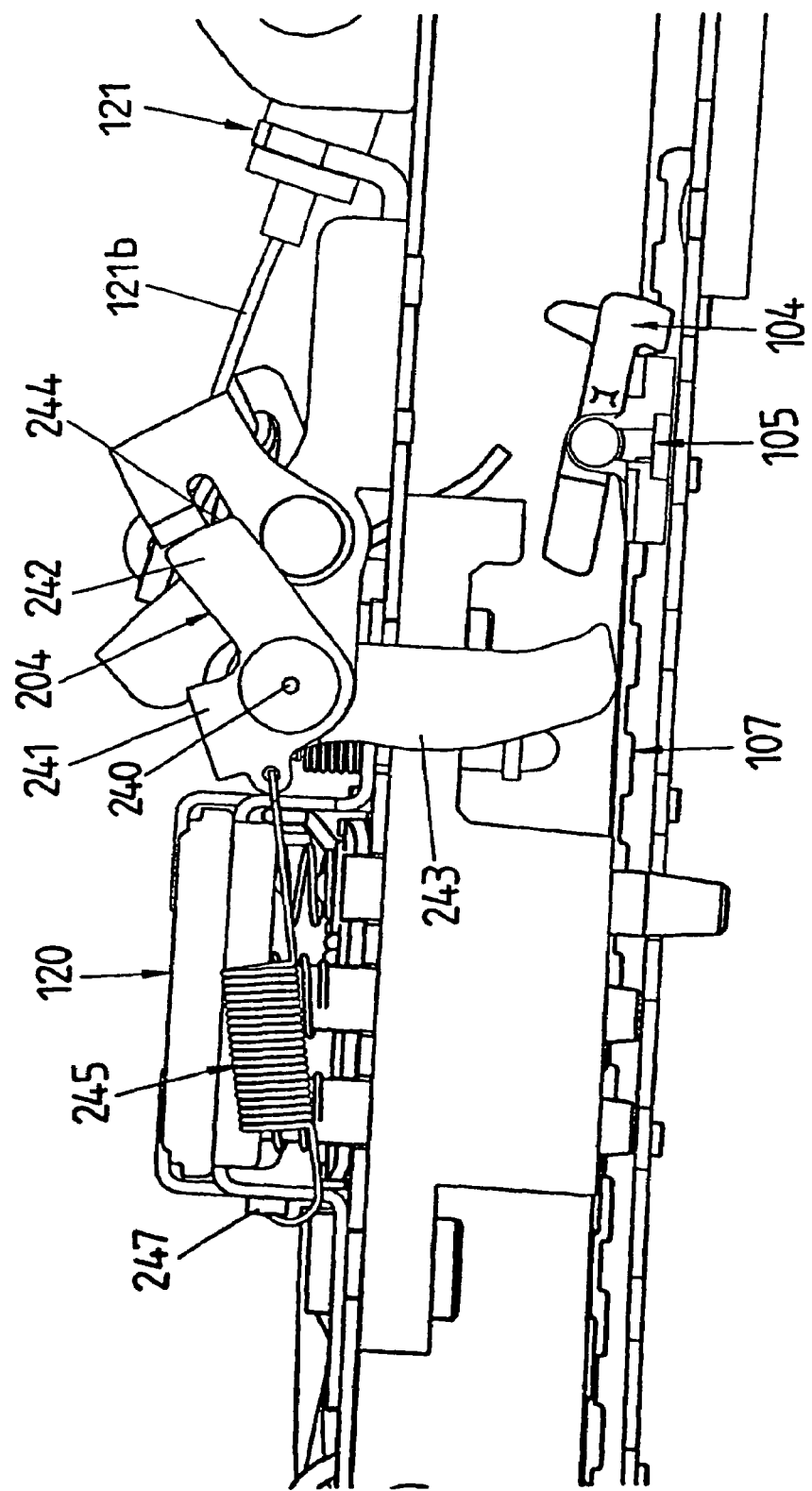

From FIG. 4e it can be discerned that during the tilting forward of the seat back beyond the point that results in a complete release of the fixing device 120, the actuation section 222 of the lever 202 arrives at the convexity 192 used for overlifting compensation of the lever extension 191, thus preventing a further, additional swivelling of the actuation lever 109 and thus additional action on the fixing device 120 that could result in damaging the fixing device 120, e.g., by excessive strain on the return springs.

When approaching the memory position with the seat back tilted forward in order to bring the seat back into a position in which a passenger can sit on the seat, the locking element 204 must first be swivelled against the action of the tension spring 245 such that the lever 202 is released before a locking of the seat frame in memory position is possible. For that purpose, a tongue 243 non-rotatably connected to the locking element 204 may be provided that, when the memory position is approached, strikes the glider 105 of the memory device 104, 105, 107, is swivelled and thus triggers a swivelling of the blocking element 204 against the pretension of the spring.

In contrast, if the seat back is tilted up at a time when the seat is located outside the memory position, there is no locking of the current longitudinal seat position by means of the fixing device 120, because the blocking element 204 prevents a back-swivelling of the lever 204 and thus a lifting of the actuation lever 109 from the released fixing device 120 or its actuation element 120b.

The arrangement depicted in FIGS. 4a through 4g is thus characterized in that, in addition to the characteristics described in detail in FIG. 1a through 3 and cited in the generic part of patent claim 1, it has a device that, with the seat back tilted forward and outside the memory position, blocks a locking of the fixing device 120, and, in fact, also, if the seat back is tilted up outside the memory position. This is caused by action on an element (lever 202) of the coupling mechanism via which the seat back is coupled with the fixing device 120 in order to release it. The device acts via a blocking element 204 on the coupling mechanism, i.e., lever 202, such that the release of the fixing device 120 having taken place subsequent to the tilting forward of the seat back cannot be canceled, because the coupling mechanism is blocked or arrested in the position in which it acts thereon for the release of the fixing device 120.

Upon again approaching the memory position after triggering the easy-entry function, an element (tongue 243) of the device cooperates with a component (glider 105) of the memory device 104, 105, 107 such that the coupling mechanism, i.e., its blocking element 204, is released again and a locking of the fixing device 120 can take place.

Figure 5A:
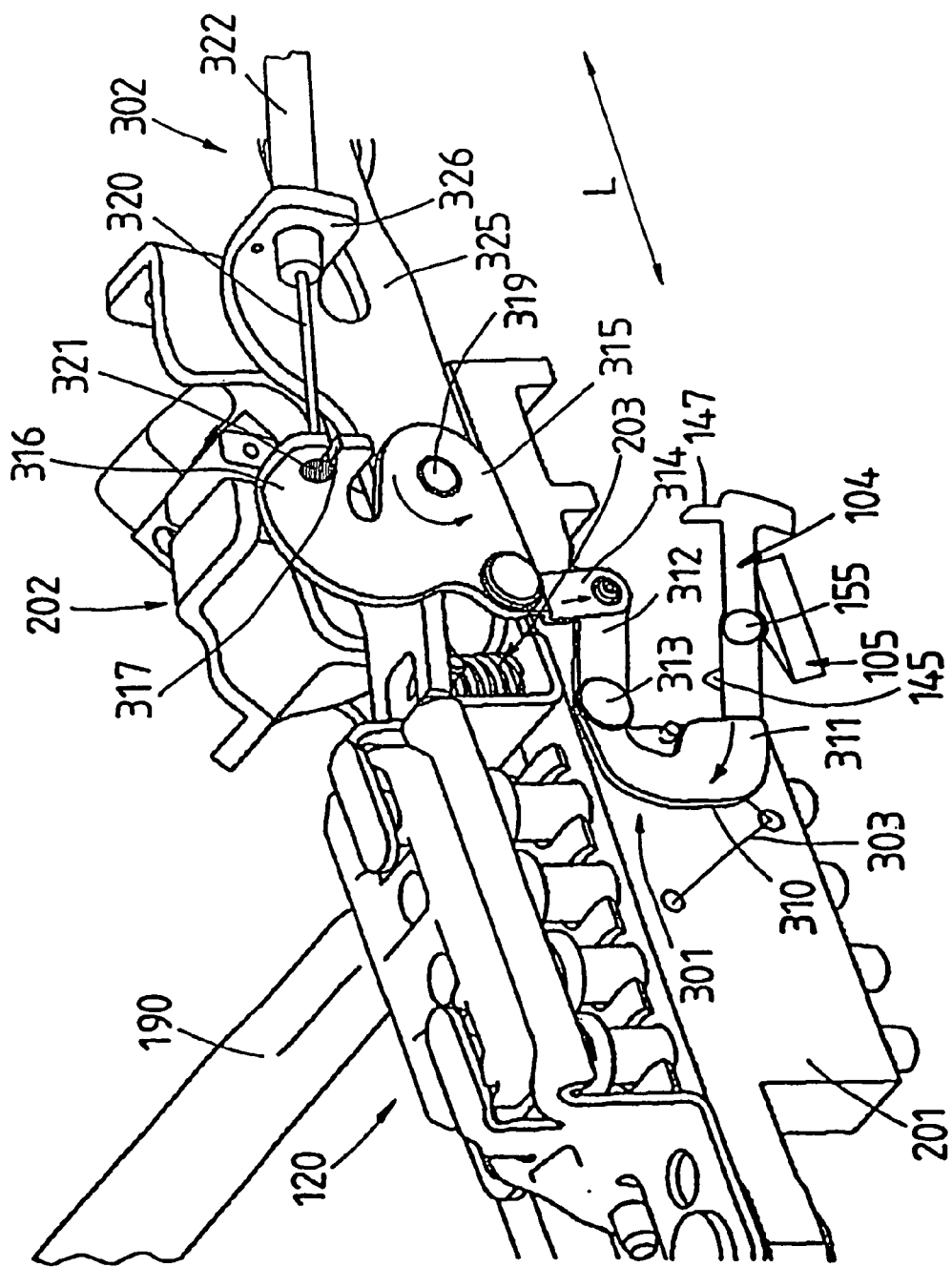
FIG. 5a is a rear view of the arrangement from FIGS. 1a to 3, in which, additionally, an actuation mechanism for the automatic release of the forward tilted seat back upon reaching the memory position is depicted.

In a perspective view, FIG. 5a depicts a rear view of the arrangement depicted in FIGS. 1a through 3, whereby, additionally an actuation mechanism 301 is provided that is in working connection with a seat back release of the seat back. All individual elements are discernible in the exploded view according to FIG. 5b.

In addition to the elements described above with reference to FIGS. 1a through 3 and FIGS. 5a and 5b for the actuation of the fixing device 120 by means of a Bowden cable during the tilting forward of the seat back as well as for the setting of the memory position while executing the easy-entry function while the seat back is tilted forward, an actuation mechanism 301 is provided that is in operational connection with a seat back release of the seat back. This actuation mechanism automatically releases the seat back while moving the seat back into the memory position after executing the easy-entry function.

The actuation mechanism 301 has a trigger lever 310 hinged swivelably to the rail 102 on the seat side of the longitudinal rail guide by means of a bolt 313 whereby its end is designed as a arresting hook 311. Application of force on this arresting hook 311 swivels the trigger lever 310 when the motor vehicle seat reaches the memory position when moved back.

At the other end 312 of the triggering lever 310 a coupling rod 314 is hinged, which is, in turn, hinge connected with a hinge lever 315. The coupling rod 314 thus serves for the hinged coupling of the triggering lever 310 with the hinge lever 315, which, by means of a bolt 319, is swivelably supported by a component 325 fixedly arranged on the seat sided rail 102.

The hinge lever 315 has a receiving segment 316 with a slit-shaped accommodation 317 for one end 321 (cable nipple) of a pulling means 320 in form of a cable. The slit-shaped accommodation 317 of the receiving segment 316 thus serves to connect the cable.

The cable 320 forms the core of a Bowden cable 302, by which the hinge lever 315 is coupled with a seat back release of the seat back. With its end facing the actuation mechanism 301, the Bowden sheath 322 of the Bowden cable 302 is supported by a stop 326 of the component 325 fixedly arranged on the seat-side rail 102.

By means of the pulling means 320, the Bowden cable 302 acts at its other end on the seat back release of the seat back, actuation of which allows a tilting back of the seat back into a use position. Means for the release of the seat back for the purpose of tilting the seat back, in particular for facilitating the entry of passengers into the back of the motor vehicle are generally known. A further discussion of a seat back release is thus not necessary. Of greater significance here, however, is the actuation mechanism 301 that effects an automatic actuation of the seat back release when the memory position of the seat is reached.

On the seat-side rail 102 or the housing of the fixing device 120 connected to it, a leg spring 303 is supported, one leg of which acts on the triggering lever 310 of the actuation mechanism 301 and elastically pretensions it such that no release of the seat back is triggered outside of the memory position by the actuation mechanism 301.

Figure 5B:
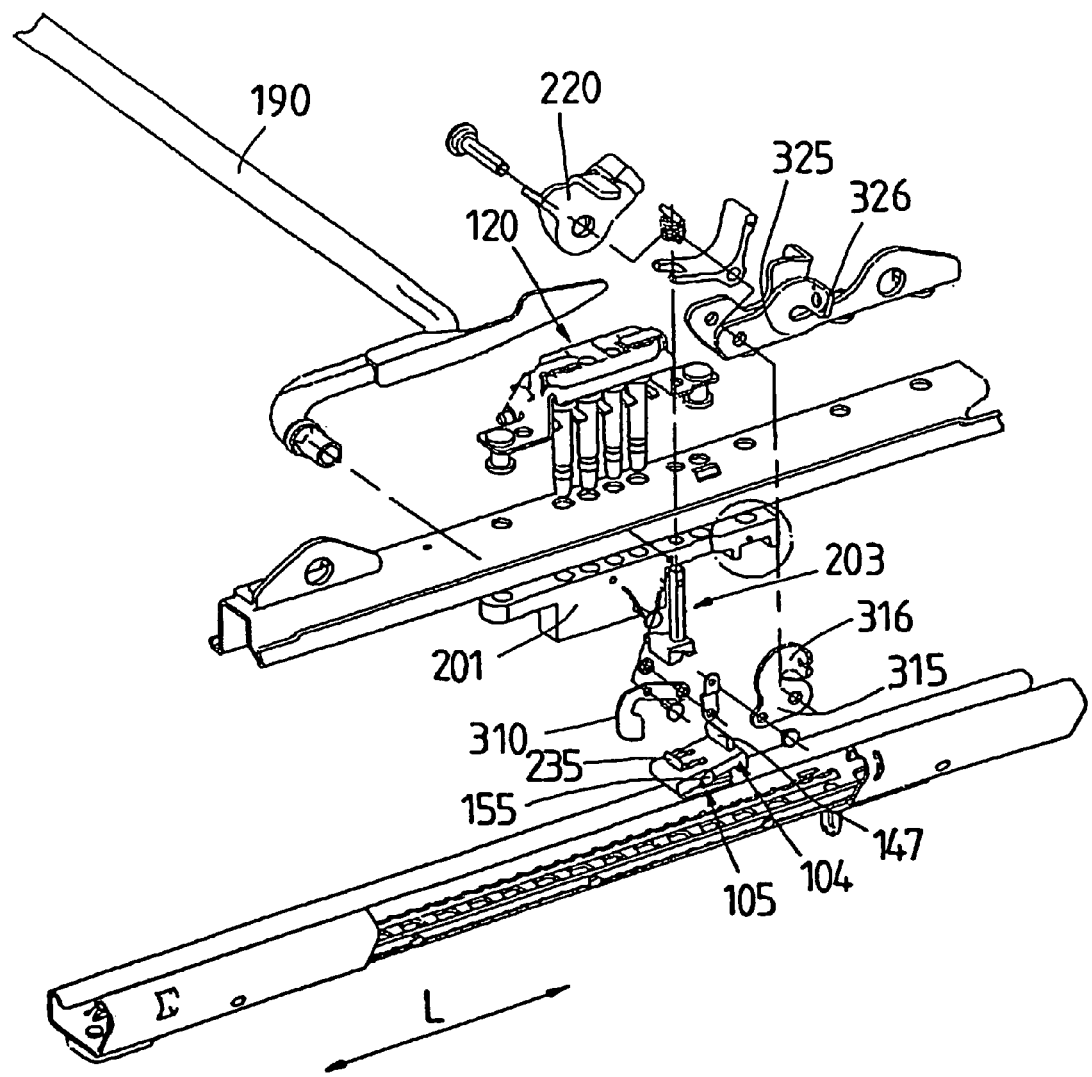

When a motor vehicle seat with the actuation mechanism 301 depicted in FIGS. 5a and 5b is moved back again into the original position, defined as the memory position, after the execution of the easy-entry function (i.e., after the forward displacement of the motor vehicle seat with forward tilted seat back) with its seat back still tilted forward and with the seat back locked in its forward tilted position, upon reaching the memory position, the arresting hook 311 of the triggering lever 310 comes into contact with the arresting catch 104 of the memory device 104, 105, 107. The triggering lever 310 hereby is deflected against the action of the leg spring 303, as depicted by means of an arrow in FIG. 5a.

The swivelling motion of the triggering lever 310 is transmitted via the coupling rod 312 to the hinge lever 315 which is thus caused to execute a swivelling motion around the bearing bolt 319 (in FIG. 5a also shown by an arrow). Due to this swivelling motion, the cable 320 of the Bowden cable 302 attached at one end 321 to the cable connection 317 of the hinge lever 315 is tightened. The tightening of the cable 320 actuates the seat back release such that the seat back can be tilted up automatically again into its original position when the memory position is reached.

In the interaction with the Bowden cable 302, the actuation mechanism 301 thus allows an automatic release of the seat back upon reaching the memory position of the seat frame. It is thus not necessary to actuate a separate release lever to release the seat back. This further improves the ease of operation when executing the easy-entry function.

Furthermore, the tilting up of the seat back upon reaching the memory position is also virtually automatic since a force toward the rear must be exerted on the seat back for the displacement of the motor vehicle seat into the memory position. Subsequent to the release of the seat back when the memory position is reached, the tilting up of the now released seat back takes place under the action of this force.

After the tilting up of the seat back, the memory device—as presented with reference to FIGS. 1a and 1b—is released again by means of the engaging piece 203; in other words, the arresting catch 104 is lifted from the arresting openings 170 of the arresting rail 107. The end of the arresting catch 104 facing the arresting hook 311 of the triggering lever 310 is lowered such that the arresting hook 311 is no longer in contact with this end of the arresting catch 104. The triggering lever 310 then returns under the action of the leg spring 303 to a position in which the tightening of the pulling means 320 is canceled and the seat back is no longer released.

The actuation mechanism 301 and the Bowden cable 302 here each form an autonomous assembly that is independent of the means described with reference to FIG. 1a through 3 for the release of the fixing device 120 while tilting the seat back forward and for the setting of the memory position.

The invention claimed is:

1. A motor vehicle seat, comprising:
  a seat frame;
  a seat back that is swivelably mounted on the seat frame and which, in a released state, can be tilted from its position of use in a longitudinal direction of a seat surface of the seat frame;
  a longitudinal guide by which the seat frame is displaceable in a longitudinal seat direction for setting of a longitudinal seat position;
  a fixing device for arresting of the seat frame in a previously set longitudinal seat position;
  a coupling mechanism, which acts on the fixing device and releases it when the seat back is tilted forward in the direction of the seat surface such that the seat frame is displaceable in the longitudinal seat direction with the seat back tilted forward; and
  a memory device by which the seat frame, in a displacement in the longitudinal seat direction, is automatically arrestable in an adjustable memory position defined as the longitudinal seat position, wherein the seat frame is provided with an actuation mechanism that is operationally connected with a seat back release when the seat back is tilted forward and which actuation mechanism actuates the seat back release upon reaching the memory position of the seat frame such that the seat back is tiltable into a position of use.

2. The motor vehicle seat according to claim 1, wherein the actuation mechanism forms a separate assembly relative to the coupling mechanism.

3. The motor vehicle seat according to claim 1, wherein the actuation mechanism is elastically pretensioned such that it does not effect a release of the seat back outside the memory position of the seat frame.

4. The motor vehicle seat according to claim 3, wherein an elastic element acts on the trigger element such that the actuation mechanism does not effect a release of the seat back outside the memory position of the seat frame.

5. The motor vehicle seat according to claim 1, wherein the actuation mechanism is triggered automatically when the seat frame reaches the memory position.

6. The motor vehicle seat according to claim 5, wherein the actuation mechanism has a trigger element that comes into an operational connection with the memory device upon reaching the memory position, and thus triggers the actuation mechanism.

7. The motor vehicle seat according to claim 6, wherein the trigger element is coupled to the seat back release by a pulling device.

8. The motor vehicle seat according to claim 7, wherein the pulling device comprises a core of a Bowden cable.

9. The motor vehicle seat according to claim 7, wherein the trigger element is connected with the pulling device by a lever arrangement.

10. The motor vehicle seat according to one of claims 7 through 9, wherein the pulling device forms a separate assembly relative to the coupling mechanism.

11. The motor vehicle seat according to claim 6, wherein the trigger element is a swivelably mounted trigger lever.

12. The motor vehicle seat according to claim 6 or 11, wherein the trigger element has a arresting hook that comes into arresting contact with the memory device upon reaching the memory position.

13. A motor vehicle seat, comprising:
   a seat frame;
   a seat back that is swivelably mounted on the seat frame and which, in a released state, is tiltable from its position of use in the direction of a seat surface of the seat frame;
   a longitudinal guide by which the seat frame is displaceable in a longitudinal seat direction for setting of a longitudinal seat position;
   a fixing device for arresting of the seat frame in a previously set longitudinal seat position;
   a coupling mechanism that acts on the fixing device and releases it when the seat back is tilted forward in the direction of the seat surface such that the seat frame is displaceable in the longitudinal seat direction with the seat back tilted forward; and
   a memory device by which the seat frame, in a displacement in the longitudinal seat direction, is automatically arrestable in an adjustable memory position defined as the longitudinal seat position,
   wherein an actuation mechanism is provided on a rail of the longitudinal guide that supports the seat frame, which actuation mechanism and seat frame are displaceable together in a longitudinal rail direction, the actuation mechanism being operationally connected with a seat back release for the seat back tilted forward and which actuates the seat back release upon reaching a memory position of the seat frame such that the seat back is tiltable into a position of use and wherein the actuation mechanism has a triggering element that comes to operational connection with the memory device upon reaching the memory position, thus triggering the actuation mechanism, the triggering element being connected by a lever arrangement with a pulling device that is coupled with the seat back release.

* * * * *